(12) United States Patent
Schlitter

(10) Patent No.: US 10,088,086 B2
(45) Date of Patent: Oct. 2, 2018

(54) SECTIONED HOSE

(71) Applicant: NEOPERL GmbH, Müllheim (DE)

(72) Inventor: Roger Schlitter, Freiburg (DE)

(73) Assignee: NEOPERL GmbH, Müllheim (DE)

( * ) Notice: Subject to any disclaimer, the term of this patent is extended or adjusted under 35 U.S.C. 154(b) by 549 days.

(21) Appl. No.: 14/408,608

(22) PCT Filed: Aug. 9, 2013

(86) PCT No.: PCT/EP2013/066729
§ 371 (c)(1),
(2) Date: Dec. 17, 2014

(87) PCT Pub. No.: WO2014/032939
PCT Pub. Date: Mar. 6, 2014

(65) Prior Publication Data
US 2015/0354740 A1    Dec. 10, 2015

Related U.S. Application Data

(63) Continuation-in-part of application No. 13/597,731, filed on Aug. 29, 2012, now Pat. No. 9,089,984, and
(Continued)

(51) Int. Cl.
*F16L 9/00*        (2006.01)
*F16L 33/207*     (2006.01)
(Continued)

(52) U.S. Cl.
CPC .......... *F16L 33/2071* (2013.01); *B26D 3/16* (2013.01); *B26D 7/08* (2013.01); *B26F 3/08* (2013.01);
(Continued)

(58) Field of Classification Search
CPC ....... F16L 33/2071; F16L 11/04; F16L 33/006
(Continued)

(56) References Cited

U.S. PATENT DOCUMENTS 2,449,356 A * 9/1948 Wilkoff ................ H04B 15/025
                                                            174/71 C
3,113,408 A   12/1963 Kirkpatrick et al.
(Continued)

FOREIGN PATENT DOCUMENTS

EP    1489343 A1   12/2004
EP    1880812 A1    1/2008
(Continued)

OTHER PUBLICATIONS

English translation of Schlitter (EP 1880812 B1).*
(Continued)

*Primary Examiner* — Patrick F Brinson
(74) *Attorney, Agent, or Firm* — David P. Dickerson

(57) ABSTRACT

A system comprising a wrapping device that forms a ring of tensioned material by wrapping a material around an outer circumference of a tube encasement, and a cutting device that cuts through an entire cross-section of the ring of tensioned material, the tube encasement and a tube encased by the tube encasement, wherein the ring of tensioned material applies a first radial force onto the tube encasement and induces a second radial force from the tube encasement onto the tube.

16 Claims, 11 Drawing Sheets

Related U.S. Application Data a continuation-in-part of application No. 11/775,890, filed on Jul. 11, 2007, now abandoned.

(60) Provisional application No. 61/694,839, filed on Aug. 30, 2012.

(51) Int. Cl.
*F16L 33/00* (2006.01)
*B26D 3/16* (2006.01)
*B26D 7/08* (2006.01)
*B26F 3/08* (2006.01)
*F16L 11/04* (2006.01)
*B26F 3/06* (2006.01)
*F16L 35/00* (2006.01)

(52) U.S. Cl.
CPC ............. *F16L 11/04* (2013.01); *F16L 33/006* (2013.01); *B26F 3/06* (2013.01); *F16L 35/00* (2013.01); *Y10T 29/49817* (2015.01); *Y10T 29/49828* (2015.01); *Y10T 83/0405* (2015.04); *Y10T 83/0596* (2015.04)

(58) Field of Classification Search
USPC .................. 138/137, 140, 141, 109, 123–127
See application file for complete search history.

(56) References Cited

U.S. PATENT DOCUMENTS

| | | | |
|---|---|---|---|
| 3,474,655 A | 10/1969 | Fulkerson | |
| 3,819,849 A * | 6/1974 | Baker | H01R 13/562 138/109 |
| 5,069,253 A * | 12/1991 | Hadley | F16L 11/12 138/109 |
| 5,931,200 A * | 8/1999 | Mulvey | F16L 19/0212 138/109 |
| 6,005,191 A | 12/1999 | Tzeng et al. | |
| 2002/0067603 A1* | 6/2002 | Driscoll | D04C 3/48 362/5 |
| 2005/0199308 A1* | 9/2005 | Swails | F16L 11/088 138/109 |
| 2007/0088319 A1 | 4/2007 | Martone | |
| 2008/0016936 A1 | 1/2008 | Schlitter | |
| 2011/0000572 A1* | 1/2011 | Ramaswamy | B32B 1/08 138/149 |

FOREIGN PATENT DOCUMENTS

| | | | |
|---|---|---|---|
| EP | 1880812 B1 * | 1/2009 | ............... B26D 3/16 |
| FR | 2762376 A3 | 10/1998 | |
| GB | 1505113 A * | 3/1978 | ........... B23D 35/001 |
| JP | 57184065 A | 11/1982 | |
| JP | 07311313 A | 11/1995 | |
| WO | 2005012780 A1 | 2/2005 | |
| WO | WO2010059542 A1 | 5/2010 | |

OTHER PUBLICATIONS

International Search Report (ISR) with regard to PCT/EP2013/066729 as completed by the EPO on Jan. 16, 2014 and dated Jan. 22, 2014.

* cited by examiner

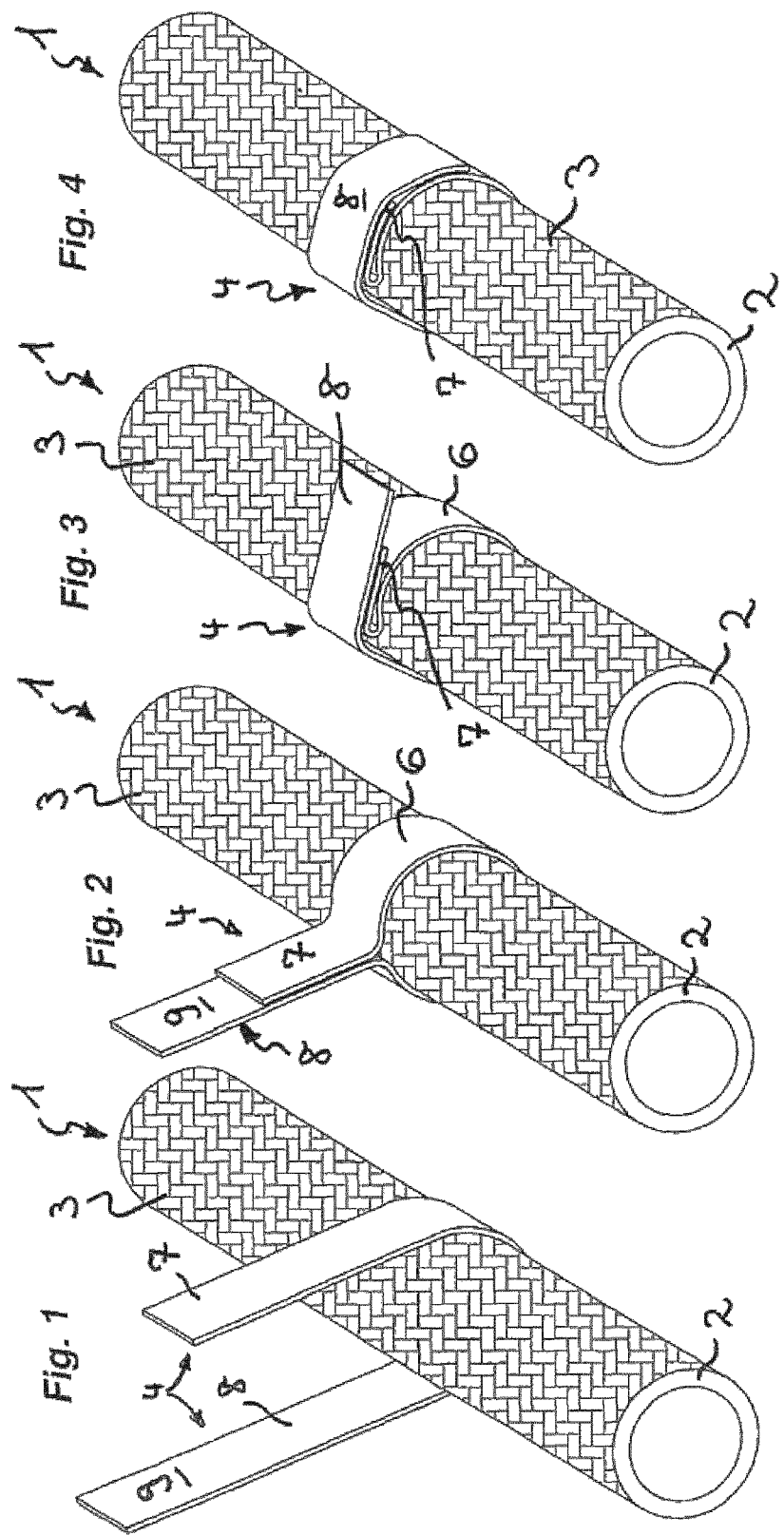

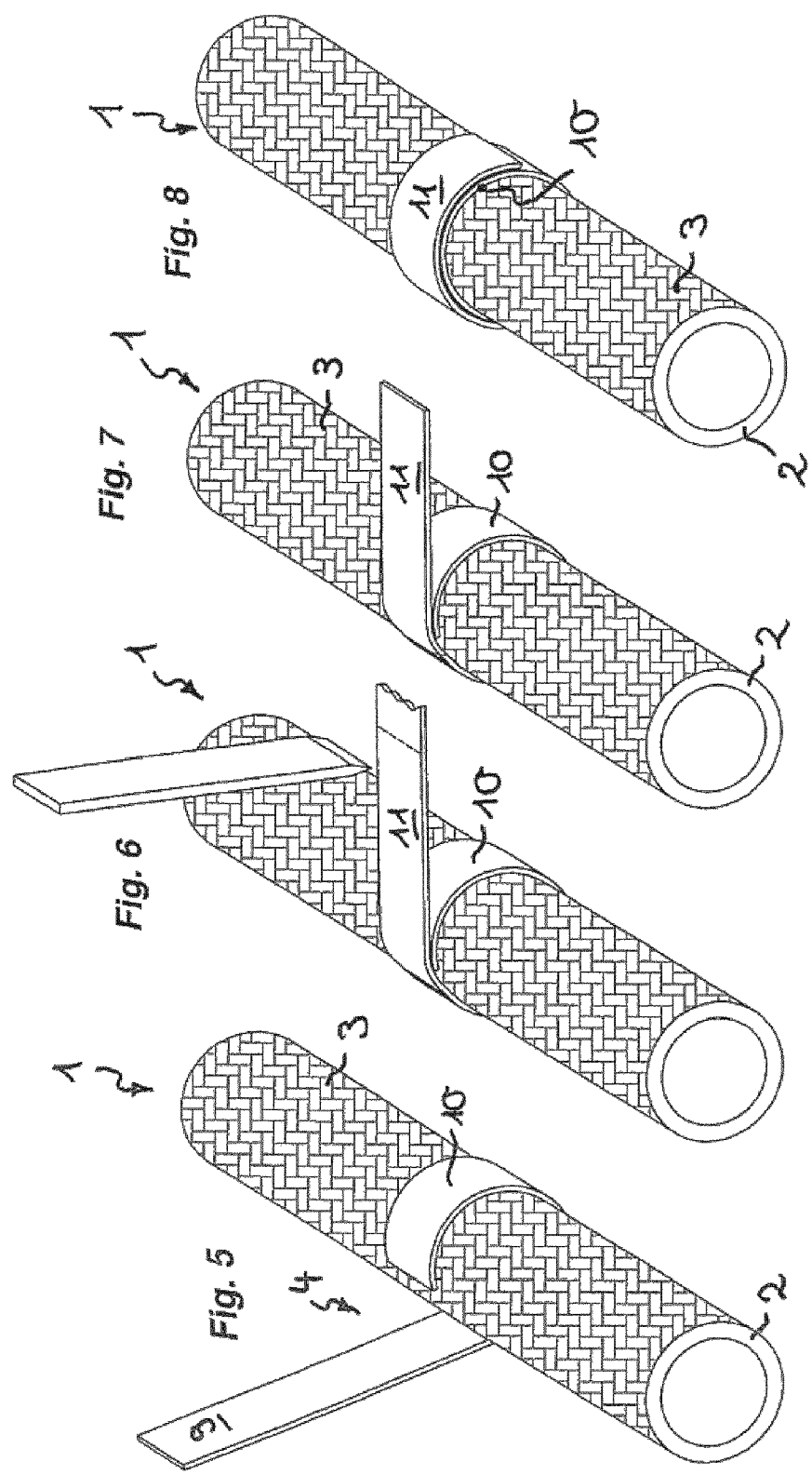

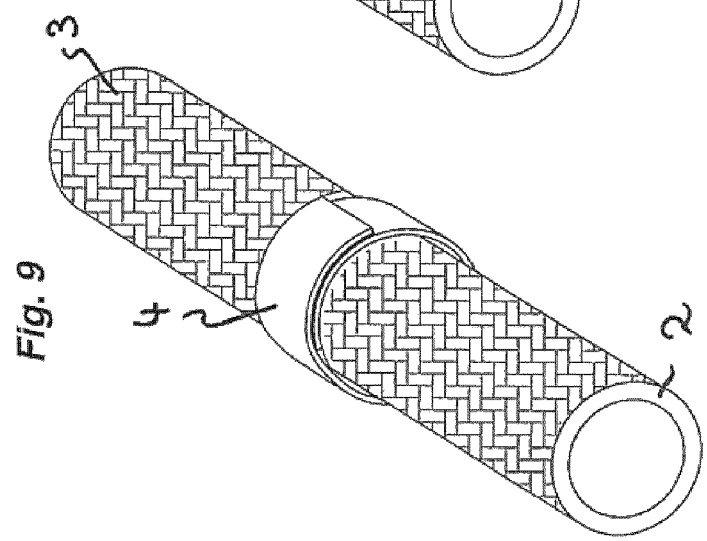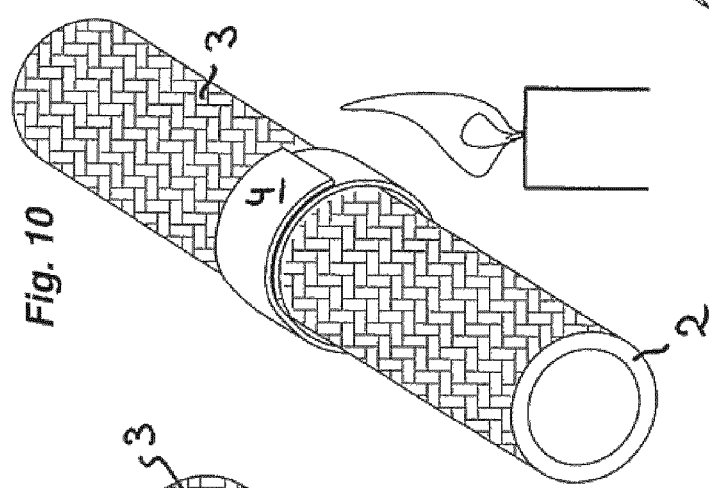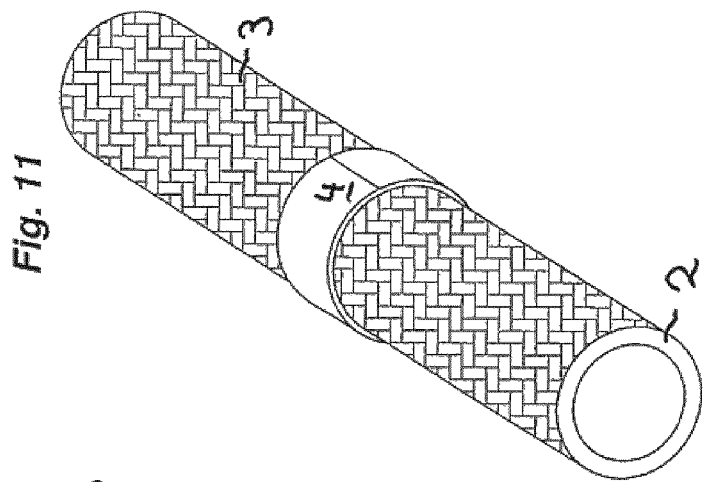

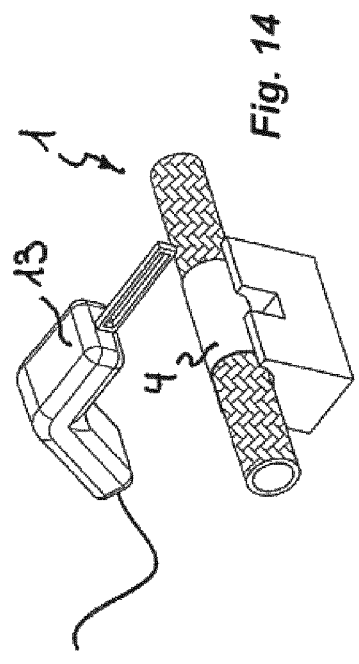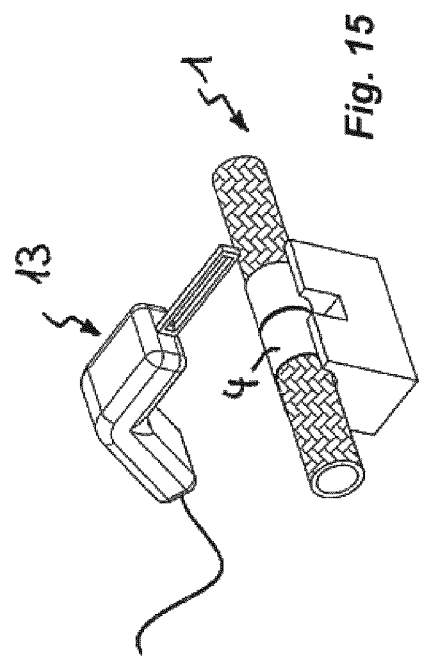

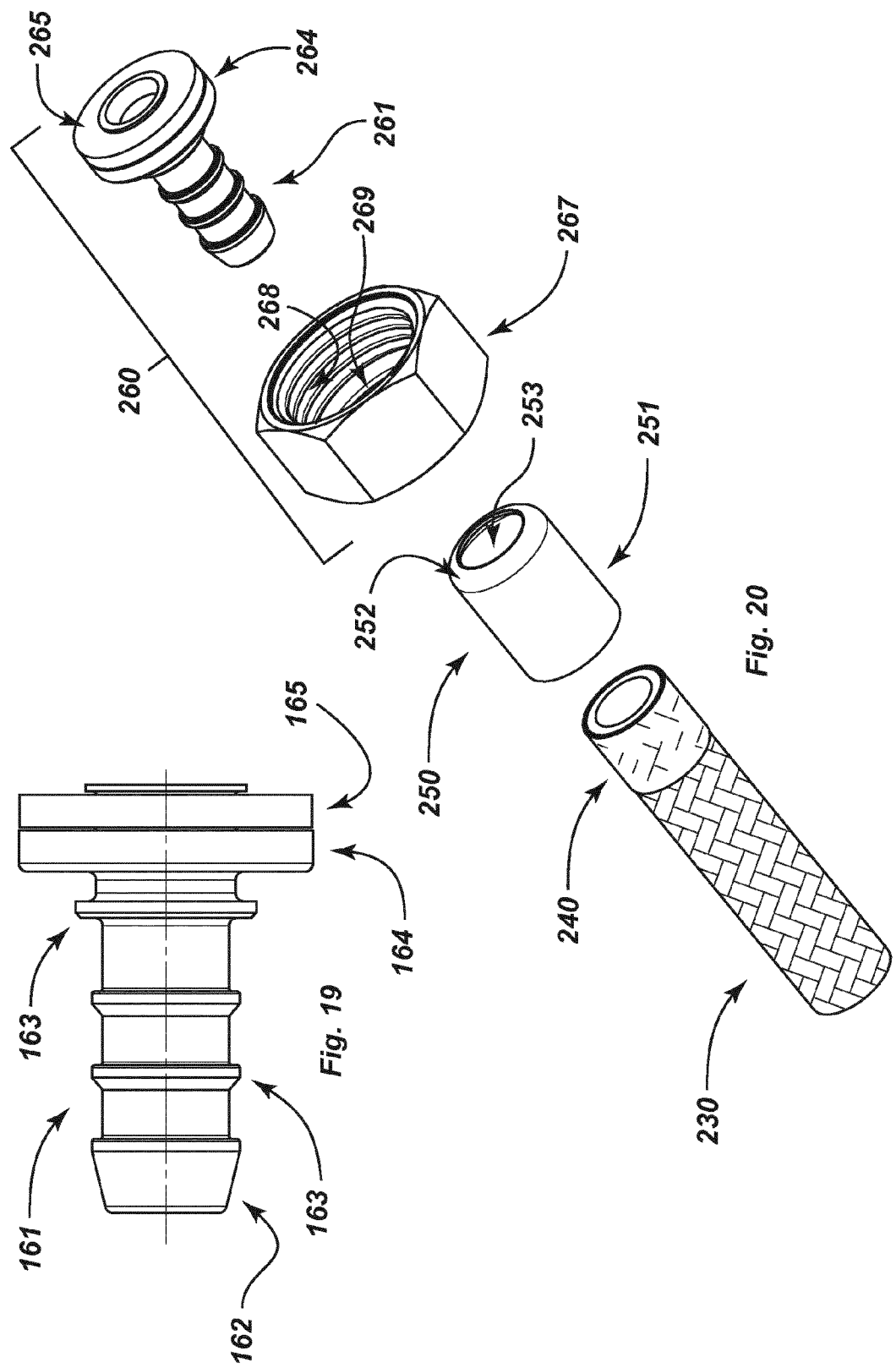

SECTIONED HOSE

CROSS-REFERENCE TO RELATED APPLICATIONS

This application claims the benefit of U.S. Provisional Application No. 61/694,839, filed on Aug. 30, 2012, and of U.S. patent application Ser. No. 13/597,731, filed on Aug. 29, 2012, and is a continuation-in-part of U.S. patent application Ser. No. 11/775,890, filed on Jul. 11, 2007, the entire disclosures of which are herein expressly incorporated by reference.

BACKGROUND OF THE DISCLOSURE

Field of the Disclosure

The present disclosure relates to a method, in particular to a method for sectioning a hose comprising a tube and a tube encasement, as well as to a hose obtained by such a process. Similarly, the present disclosure relates to a hose, in particular to a hose comprising a tube and a tube encasement. The present disclosure furthermore relates to a system, in particular to a system for sectioning a hose comprising a tube and a tube encasement.

Description of the Related Art

It is known to interconnect sanitary fittings such as valves and faucets using a hose comprising a plastic tube encased by a web of braided plastic or metal. The plastic tube provides a watertight channel from one end of the hose to the other, while the braided encasement ensures that the plastic tube is well protected from abrasion without overly restricting flexibility of the hose.

The present disclosure expounds upon this background.

SUMMARY OF THE PRESENT DISCLOSURE

Loosely speaking, the present disclosure teaches a method of sectioning a tube and a tube encasement that increases the reliability of a resultant hose and reduces the occurrence of plumbing mishaps (i.e. floods) that are strongly frowned upon by consumers.

In one embodiment, the present disclosure teaches a method of sectioning a tube and a tube encasement in which a ring of tensioned material is formed around an outer circumference of the tube encasement that may formed of a braided or wound material. The ring of tensioned material acts to induce radial forces that prevent longitudinal displacement of the tube encasement relative to the tube. The ring of tensioned material may be formed by wrapping a (strip of) tensioned material around the outer circumference of the tube encasement. The tube and the tube encasement can then be sectioned by cutting through an entire cross-section of the ring of tensioned material, the tube encasement and the tube.

In another embodiment, a strip of material is wrapped around an outer circumference of the (braided/wound) tube encasement. The wrapped strip of material is then shrink processed, e.g. by heat shrinking, into a ring of tensioned material to induce the aforementioned radial forces. The tube and the tube encasement can then be sectioned by cutting through an entire cross-section of the ring of tensioned material, the tube encasement and the tube. Again, the ring of tensioned material acts to induce radial forces that prevent longitudinal displacement of the tube encasement relative to the tube.

In another embodiment, a ring of bonded material is formed at an outer circumference of the (braided/wound) tube encasement. The ring of bonded material forms a bond between the tube encasement and a tube encased by the tube encasement, which likewise prevents longitudinal displacement of the tube encasement relative to the tube.

In another embodiment, longitudinal displacement of the tube encasement relative to the tube is prevented by gripping the tube encasement against the tube before the tube and the tube encasement are cut and retaining the grip until the tube encasement is bonded to the tube, e.g. by crimping an end piece against an outer surface of the tube encasement. To prevent fraying of the tube encasement, a (strip of) material may be wrapped around an outer circumference of the (braided/wound) tube encasement or a ring of bonded material may be formed at an outer circumference of the (braided/wound) tube encasement.

By preventing displacement of the tube relative to the tube encasement during and subsequent to cutting thereof, misalignment of the various components assembled during manufacture of a hose can be prevented, thus increasing the reliability of the hose and reducing the occurrence of plumbing mishaps (i.e. floods) that are strongly frowned upon by consumers. The avoidance of such mishaps plays a large role in establishing and maintaining consumer satisfaction.

Still loosely speaking, it may be noted that the aforementioned techniques of the present disclosure not only prevent displacement of the tube encasement relative to the tube, but also inhibit fraying of the (braided/wound) tube encasement subsequent to cutting thereof. This, too, prevents misalignment of the various components assembled during automated manufacture of the hose. As such, the techniques of the present disclosure act synergistically to increase the reliability of the hose.

In one aspect, as touched upon supra, the present disclosure relates to a method. The method may be a method for sectioning a tube and a (braided/wound) tube encasement. For example, the method may be a method for sectioning a hose comprising a tube and a (braided/wound) tube encasement. Similarly, the method may be a method for manufacturing a (sanitary) hose.

The tube may be a plastic tube, e.g. a tube of a polyethylene, a polyolefine, a cross-link polyethylene, a polyvinylchloride or a polypropylene. The tube may be a rubber tube. In other words, a wall of the tube may be of a plastic or rubber material.

The wall, in particular an inner surface of the wall, defines a lumen of the tube. The wall may have an outer surface, e.g. opposite the inner wall, that defines an outer circumference of the tube. The tube may have a cylindrical shape. The tube may be circular in cross-section. The tube may be understood as having a longitudinal axis. When the respective ends of the tube are positioned most distant from one another, i.e. when the tube is in a straight, unbent state, the longitudinal axis may be understood as the set of points defined by an axis of (approximate) rotational symmetry of the tube. When the tube is in a curved, bent state, the longitudinal axis may be understood as the set of points of local rotational symmetry of (approximately) circular cross-sections through the tube. Similarly, the longitudinal axis may be a longitudinal axis of a cylindrical shape of the tube. In the present disclosure, a longitudinal direction may be understood as a direction parallel/tangent to the respective longitudinal axis (at a given cross-section). Similarly, a radial direction may be understood as a direction orthogonal to the longitudinal direction (at a given cross-section). A longitudinal force may be a force acting in a (substantially) longitudinal direction (at a cross-section were the force is acting/enacted). A radial force may be a force acting in a (substantially) radial direction (at a cross-section were the force is acting/enacted).

Although set forth solely in the context of a tube, the disclosure of the preceding paragraph applies mutatis mutandis to the tube encasement, to a wall of the tube encasement, as well as to any section of the tube and/or the tube encasement.

The wall of the tube may have a smooth inner surface and/or a smooth outer surface. At least one of the inner surface and the outer surface of the tube may have a (substantially) uniform cross-section along a(n entire) length of the tube. Similarly, the wall of the tube may be corrugated, e.g. such that a diameter of the tube varies (roughly sinusoidally) as a function of a longitudinal direction of the tube. The outer surface of the wall of the tube may comprise a spiral groove, i.e. a groove whose circumferential position varies (continuously) as a function of a longitudinal direction of the tube. The spiral groove may be a helical groove.

The lumen may have a (minimum) diameter of at least 3 mm, at least 5 mm or at least 10 mm. The lumen may have a (maximum) diameter of less than 20 mm, less than 15 mm, less than 10 mm or less than 5 mm. The wall may have a (radial) thickness of at least 0.1 mm, at least 0.5 mm or at least 1 mm. The wall may have a (radial) thickness of less than 5 mm, less than 2 mm, less than 1 mm or less than 0.5 mm. The tube may have a (maximum) diameter of less than 25 mm, less than 15 mm or less than 10 mm, e.g. as measured between two points on the outer circumference of the tube.

The tube may have a (finite) length of at least 10 m, at least 30 m or at least 50 m. The tube may have a length of less than 30 m, less than 50 m or less than 100 m. Similarly, the tube may be manufactured in a continuous process and thus be of effectively infinite length. For example, as will be explained in further detail infra, the tube may be manufactured, encased in a tube encasement (of a braided/wound material) and fed to a cutting device (that sections the tube) in a continuous process.

The tube encasement may encase the tube along (substantially) an entire length of the tube. Similarly, the tube encasement may encase an entire outer circumference of the tube. The tube encasement may encase the tube in a manner that allows longitudinal displacement of the tube relative to the tube encasement, e.g. during bending of the tube together with the tube encasement. In the present disclosure, the tube and the tube encasement may be understood as a substantially unitary arrangement, the tube encasement encasing an entire outer circumference of the tube over (substantially) an entire length of the tube. The tube and the tube encasement may be of (substantially) identical length, e.g. may differ in length by less than 5%, less than 2% or less than 1%. One or both ends of the tube may be coincident with a respective end of the tube encasement. An inner circumference of the tube encasement may have a (circular) cross-section that is (substantially) identical to a cross-section of an outer circumference of the tube. The tube encasement may have a uniform cross-section along an entire length of the tube encasement. The inner circumference of the tube encasement may have a (circular) cross-section having a diameter less than 0.1%, less than 0.5% or less than 1% larger than a (maximum) diameter of the tube, e.g. as measured between two points on the outer circumference of the tube.

The method may comprise forming the tube encasement, e.g. on an outer circumference of the tube. For example, as will be discussed in further detail infra, the method may comprise braiding a plurality of strands and/or strips, e.g. in a continuous process, onto an outer circumference of the tube. As such, the tube encasement may be formed of/comprise a braided plurality of strands and/or strips. The plurality of strands/strips may comprise strands of polymer (fiber) and/or strands of metal (wire). For example, the plurality of strands may comprise strands of polyamide (fiber) and/or stands of stainless steel (wire). Similarly, the plurality of strands may comprise bioplastic strands, i.e. strands of a material derived from renewable biomass. The individual strands may have a diameter in the range of 0.02 to 0.5 mm. The plurality of strands/strips may comprise strips of a plastic material, e.g. PET or bioplastic, and/or strips of stainless steel. For the sake of better legibility, the present description will use the term "strand" hereinbelow in lieu of the expression "strips/strands" to designate strands and/or strips of material that form the tube encasement.

The tube encasement may comprise in the range of 20 to 200 strands. The strands may be arranged in groups, e.g. groups of 2 to 6 strands. For example, the tube encasement may comprise 96 strands grouped into 24 groups of four strands or 60 strands grouped into 12 groups of five strands. The individual strands of a respective group may be arranged parallel to the other stands of the respective group.

The method may comprise braiding the strands in a biaxial or triaxial pattern. For example, the strands may be braided in a biaxial pattern in which a first set, e.g. half, of the strands spiral around the tube in a first circumferential direction as a function of a longitudinal direction of the tube and a second set, e.g. the other half, of the strands spirals around the tube in a second, opposite circumferential direction as a function of the longitudinal direction of the tube, strands of the first set crisscrossing strands of the second set. Similarly, the strands may be braided in a triaxial pattern in which a first set of the strands spirals around the tube in the first circumferential direction as a function of a longitudinal direction of the tube, a second set of the strands spirals around the tube in the second circumferential direction as a function of the longitudinal direction of the tube and a third set of the strands extends substantially in the longitudinal direction of the tube, strands of each set crisscrossing strands of the other sets.

The strands may be braided in a (simple) biaxial pattern in which each respective strand/group of strands belonging to the first set alternately crosses over/under one strand/group of strands belonging to the second set of strands and each respective strand/group of strands belonging to the second set alternately crosses over/under one strand/group of strands belonging to the first set of strands. Similarly, the strands may be braided in a (two over, two under) biaxial pattern in which each respective strand/group of strands belonging the first set alternately crosses over/under two strands/groups of strands belonging to the second set of strands and each respective strand/group of strands belonging the second set alternately crosses over/under two strands/groups of strands belonging to the first set of strands. The braiding pattern may be a herringbone pattern. For example, the (two over, two under) braiding pattern may be such that one of the two strands/groups of strands passed over/under a first strand/group of strands is (oppositely) passed under/over by each strand/group of strands that neighbors the first strand/group of strands.

The method may comprise tensioning any (e.g. one, at least two or each) of the strands as the strands are braided (onto the tube). (An elucidation of the term "any" is given in the closing paragraphs of this specification.) For example, any of the strands may be tensioned with a tension in the range of 5 to 200 Newton. For example, polyamide fibers having a diameter in the range of 0.02 to 0.5 mm may be tensioned with a tension of 20 to 200 Newton when braided onto a tube having an outer diameter in the range of 8 to 10 mm. Similarly, stainless steel wires having a diameter in the range of 0.02 to 0.5 mm may be tensioned with a tension of 5 to 50 Newton when braided onto a tube having an outer diameter in the range of 5 to 8 mm.

As discussed supra, the tube encasement may be formed by braiding a plurality of strands onto an outer circumference of the tube. Similarly, the tube encasement may be formed by wrapping a material spirally onto an outer circumference of the tube. The material may be a plastic material, e.g. PET, or a bioplastic material derived from renewable biomass. The material may be in the form of a strip, e.g. having a width in the range of 5 mm to 25 mm. The strip of material may be wrapped (onto the outer circumference of the tube) such that an edge of the strip of material overlaps another (laterally opposite) edge of the strip of material, e.g. with an overlap in the range of 2 mm to 10 mm. Similarly, the material may be in the form of one or more strands, e.g. having an individual diameter in the range of 0.5 mm to 2 mm. The one or more strands of material may be wrapped (onto the outer circumference of the tube) such that each strand abuts a (laterally) neighboring strand. The tube encasement may comprise a plurality of layers of the material, each layer being wrapped as described above. In other words, one or more (additional) layers of the material may be wrapped spirally onto a layer of the material wrapped directly onto the outer circumference of the tube. One or more of the additional layers may be wrapped in a circumferential direction around the tube that differs from a circumferential direction with which the material is wrapped directly onto the outer circumference of the tube. For example, the additional layers may be wrapped in alternating circumferential directions, i.e. such that the circumferential wrapping direction of each layer differs from the circumferential wrapping direction of adjacent layers.

The method may comprise providing/forming a displacement inhibiting device on/around an outer circumference of the tube encasement. Similarly, the method may comprise forming a displacement inhibiting region at an outer circumference of the tube encasement. The displacement inhibiting device/region may serve to inhibit longitudinal displacement of the tube encasement relative to the tube. The displacement inhibiting device/region may furthermore to inhibit fraying (of the braided strands) of the tube encasement during/subsequent to sectioning of the tube encasement. The displacement inhibiting device/region may have an elasticity that allows dilation of the lumen of the tube during insertion of a portion, e.g. insert portion as discussed infra, of a connector into the lumen.

The displacement inhibiting device/region may comprise/consist of a ring of tensioned material. The ring of tensioned material may exert a radial force onto the tube encasement and induce a radial force from the tube encasement onto the tube, which radial force induces a frictional force that restricts displacement of the tube encasement relative to the tube. The radial force from the tube encasement onto the tube may be large enough to cause plastic deformation (on an outer circumference) of the tube, e.g. plastic deformation patterned by the braided strands of the tube encasement. Similarly, the displacement inhibiting region may comprise/consist of a ring of bonded material at an outer circumference of the tube encasement. The ring of bonded material may inhibit displacement of the tube encasement relative to the tube by forming a bond between the tube encasement to the tube. As such, the displacement inhibiting device/region may be termed a "tube fixation means."

As touched upon supra, the method may comprise forming a ring of tensioned material on/around an outer circumference of the tube encasement, e.g. at a (longitudinal) position where the tube is to be sectioned.

The material may be a metal, e.g. in the form of steel wires. The steel wires may have a diameter in the range of 0.1 mm to 1.5 mm. As discussed hereinbelow, the forming of a ring of tensioned material may comprise wrapping (a length of) the metal material (spirally) around the outer circumference of the tube encasement, e.g. in the range of 10 to 50 or 10 to 20 times around the outer circumference of the tube encasement. In general, increasing the number of revolutions around the outer circumference of the tube encasement and/or increasing the diameter of the wire increases the frictional force that restricts displacement of the tube encasement relative to the tube, yet reduces the elasticity that allows dilation of the lumen of the tube during insertion of a portion of a connector into the lumen.

Similarly, the material may be a plastic material, e.g. polyester, vinyl or nylon. The material may be a heat-shrinkable plastic. The material may have the form of a strip having a width of less than 30 mm, less than 15 mm or less than 10 cm. The strip of material may have a width of at least 6 mm or at least 10 mm. The strip of material may have a thickness of less than 0.3 mm, less than 0.15 mm or less than 0.08 mm. The material may be tensioned such that the shape of the tube is not (substantially) distorted. For example, the material may be tensioned such that the cross-section of the lumen of the tube is not permanently altered. The material may be tensioned such that at least part of a structure, e.g. of a braid, at the outer circumference of the tube encasement permeates through the tensioned material to an outer circumference of the ring of tensioned material.

The forming of a ring of tensioned material may comprise securing a first end of the material to an outer circumference of the tube encasement, e.g. at a (longitudinal) position where the tube is to be sectioned, and wrapping the material around the outer circumference of the tube encasement. The forming of a ring of tensioned material may comprise securing a second end of the material to an outer circumference of the wrapped material.

The securing of the first end of the material to the outer circumference of the tube encasement may comprise pressing a portion of the material against the outer circumference of the tube enclosure, e.g. using a pressing device. The material may be pressed against the outer circumference of the tube enclosure with a pressure that ensures that the first end of the material does not dislocate during wrapping of the material and that does not (substantially) distort the shape of the tube, e.g. that does not result in permanent alteration of the cross-section of the lumen of the tube.

Similarly, the securing of the first/second end of a strip of material to the outer circumference of the tube encasement may comprise adhering a portion of the strip of material to the outer circumference of the tube encasement using an adhesive. In this respect, at least one major surface of the strip of material may comprise one or more self-adhesive portions or be (entirely) coated with an adhesive.

The pressing device may be retracted from the material after the material has been wrapped at least partially around the tube encasement, e.g. to allow the material to be wrapped over the portion of the material against which the pressing device has been pressing.

The wrapping of the material around the outer circumference of the tube encasement may comprise rotating a supply (roll) of the material circularly or spirally around the tube encasement. For example, a supply (roll) of the material may be mounted on a rotary carriage of a wrapping device, the tube and the tube encasement passing through a central opening in the rotary carriage, the rotary carriage rotating around the tube and the tube encasement to wrap the material around the outer circumference of the tube encasement. The tube and the tube encasement may be transported in a longitudinal direction during rotation of the rotary carriage to effect a spiral wrapping of the material. As touched upon above, the pressing device may be retracted from the material after the material has been wrapped at least partially around the tube encasement, e.g. to allow the rotary carriage to rotate past the pressing device.

The wrapped material may extend (circumferentially) at least 380°, at least 420° or at least 480° around an outer circumference of the tube encasement. The wrapped material may extend (circumferentially) less than 720°, less than 540° or less than 420° around an outer circumference of the tube encasement. The method may comprise cutting the material to a desired length, e.g. after securing the first end of the material to the tube encasement and/or after wrapping the material at least partially around the tube encasement.

To form the ring of tensioned material, the material may be wrapped around the outer circumference of the tube encasement under tension. As such, the method may comprise tensioning the material and wrapping the tensioned material around the outer circumference of the tube encasement. The tensioning of the material may be effected by restricting/controlling a feeding of the material (from a supply roll), e.g. as the material is wrapped around the tube encasement. For example, the material may be fed (from a supply roll) to the outer circumference of the tube encasement via a tensioning mechanism that ensures that the material being wrapped, i.e. the section (of the material) between the tensioning mechanism and the material secured to the tube encasement, is under (a user-specified) tension. The tensioning mechanism may comprise one or more (tensioning) rollers that contact the material, e.g. at least one major surface of a strip of material, as it is fed from a supply roll to the outer circumference of the tube encasement. The (tensioning) rollers may be configured such that a rotational force required to respectively turn the (tensioning) rollers is adjustable, e.g. by turning of an adjustment screw or an adjustment knob. The tensioning mechanism may be mounted on a rotary carriage of a wrapping device, e.g. as described supra.

Similarly, the forming of a ring of tensioned material may comprise cinching up the material wrapped around the tube encasement, e.g. by pulling the second end (to tension the material) before the second end is secured to the outer circumference of the wrapped material.

The method may comprise applying pressure to the material in a direction of the tube encasement during (at least a portion of) the wrapping. The pressure may be applied at an area of first contact between the tube encasement and the material as the area of first contact moves circumferentially around (at least half a circumference of) the tube encasement during the wrapping. The pressure to the material need not be applied during the entire wrapping process. Instead, the pressure might be applied only within a limited portion (e.g. more than 180° or more than 270° and e.g. less than 270° or less than 360°) of the circumference of the tube encasement. The pressure may be applied by a pressure surface, e.g. by a (pinch) roller.

For example, the forming of a ring of tensioned material may comprise pinching the (tensioned) material against the tube encasement as the material is wrapped around the outer circumference of the tube encasement. The pinching may be effected at a location where a supply of the material first contacts the tube encasement, i.e. at a location that moves circumferentially as the material is wrapped around the outer circumference of the tube encasement. As touched upon supra, the pinching may be effected by a (pinch) roller. The (pinch) roller may rotate around the tube encasement as the material is wrapped. The (pinch) roller may be mounted on a rotary carriage of a wrapping device, e.g. as described supra. A motion, e.g. a radial position, of the (pinch) roller may be controlled such that the (pinch) roller effects the pinching only during a portion of the wrapping.

The forming of a ring of tensioned material may comprise shrinking a (tensioned) strip of material wrapped around the tube encasement, e.g. by subjecting the wrapped strip of material to heat, e.g. using a heating element/device. In this respect, the strip of material may be manufactured of a heat-shrinkable material.

The forming of a ring of tensioned material may comprise forming a strip of material into a partial loop around an outer circumference of the tube encasement, e.g. at a (longitudinal) position where the tube is to be sectioned, closing the loop by adhering a first major surface of the strip of material at a first end of the strip of material to the first major surface of the strip of material at a position spaced from a second end of the strip of material, optionally snugging a closure point of the loop to the outer circumference of the tube encasement, folding the strip of material at a closure point of the loop such that a second major side of the strip of material at the first end of the strip of material lies against a portion of the second major surface that forms an outer circumference of the looped strip of material, tensioning (e.g. "cinching up") the second end of the strip of material in the direction of folding and adhering the first major surface of the strip of material at the second end of the strip of material to the outer circumference of the looped strip of material or (if the second end wraps fully around the looped strip of material) to an outer circumference of the tensioned second end.

As touched upon supra, the method may comprise forming a ring of bonded material at an outer circumference of the tube encasement, e.g. at a (longitudinal) position where the tube is to be sectioned.

The ring of bonded material may comprise a bonding material that differs from (and bonds) a material/the strands of the tube encasement. For example, the ring of bonded material may be formed by applying (e.g. injecting, brushing and/or spraying) a bonding material into/onto the outer circumference of the tube encasement. The bonding material may bond a plurality of strands of the tube encasement into a unitary structure, i.e. into a ring of bonded material. The bonding material may be an adhesive. The bonding material may be a hot-melt adhesive, e.g. an adhesive comprising a thermoplastic such as ethylene-vinyl acetate. Similarly, the bonding material may be an ultraviolet light curing adhesive. The method may comprise curing the bonding material, e.g. by cooling or by application of ultraviolet light. The ring of bonded material may form a bond between the tube encasement and the tube, e.g. by extending from the outer circumference of the tube encasement to the tube.

The ring of bonded material may be formed by melting (and cooling/allowing to cool) a plurality of strands of the tube encasement into a unitary structure. The melting may be effected by application of heat or ultrasonic energy to the strands, e.g. by means of a hot/ultrasonic press, e.g. a press having a plurality of heated/ultrasonic jaws that effect a melting and clamping around an outer circumference of the tube encasement. The clamping (or similar processing) may be carried out such that the shape of the tube is not (substantially) distorted. For example, the clamping/processing may be carried out such that the cross-section of the lumen of the tube is not permanently altered.

The displacement inhibiting device/region may have a width of less than 30 mm, less than 15 mm or less than 10 cm in a longitudinal direction of the tube encasement. The displacement inhibiting device/region may have a width of at least 6 mm or at least 10 mm in a longitudinal direction of the tube encasement.

The method may comprise cutting through an entire cross-section of the displacement inhibiting device/region, the tube encasement and the tube, e.g. in a single cut. In other words, the method may comprise cutting through an entire cross-section of the ring of tensioned material, the tube encasement and the tube. Similarly, the method may comprise cutting through an entire cross-section of the ring of bonded material, the tube encasement and the tube. The cutting may be effected by a machine, e.g. by a machine that uses a knife, a saw or other cutting tool to perform the cutting. Similarly, the cutting may be performed using a heated element, e.g. a heated element capable of melting its way through a cross-section of the displacement inhibiting device/region, the tube encasement and the tube.

The cutting may comprise melting a portion of the tube encasement. The melted portion, when cooled to 80° C. or to room temperature, may bond the tube to the tube encasement. Accordingly, the method may comprise allowing the melted portion to cool (to 80° C. or to room temperature) and/or cooling the melted portion (to 80° C. or to room temperature). A bond established by the (cooled) melted portion may (be strong enough to) withstand a force of at least one of 5 newton, 10 newton and 50 newton in a longitudinal direction of the tube encasement (at a location of the bond).

The method may comprise measuring off a length of the hose (i.e. a length of the tube and the tube encasement) and cutting the hose to obtain a section of hose having the measured-off length. The measuring off may comprise transporting the hose in a longitudinal direction for a distance equal to the measured-off length. The measured-off length may be specified by a user input, e.g. by (user-specified) digital data or by a position of a (user-manipulable) knob. As such, the method may comprise receiving a user input indicative of the measured-off length. Similarly, the method may comprise measuring off a length of the hose (i.e. a length of the tube and the tube encasement) and forming the displacement inhibiting device/region at the measured off length (i.e. distance) from an adjacent displacement inhibiting device/region. Again, the measuring off may comprise transporting the hose in a longitudinal direction for a distance equal to the measured-off length. The measuring off may be performed by a (precision transport) device that transports the hose a distance equal to the measured-off length with an accuracy of ±1 mm or ±0.5 mm.

The cutting may be effected in a plane (substantially) perpendicular to a longitudinal axis of the tube (at a point where the cut intersects the longitudinal axis of the tube). Similarly, the cutting may be effected in a plane skewed relative to a plane perpendicular to a longitudinal axis of the tube (at a cross-section of the cut) by no more than 5°, by no more than 10° or by no more than 15°. The displacement inhibiting device/region, the tube encasement and the tube may be (substantially) concentrically/coaxially arranged during the cutting. Likewise, the displacement inhibiting device/region, the tube encasement and the tube be radially nested at a (e.g. planar) cross-section of the cut during the cutting. The cutting may be effected in a central third of the displacement inhibiting device/region as determined in a longitudinal direction.

The cutting may section the tube into a first tube section and a second tube section. Similarly, the cutting may section the tube encasement into a first tube encasement section and a second tube encasement section. Any (e.g. one or more or each) of the first/second tube (encasement) sections may have a length of less than 3 m, less than 1 m or less than 50 cm. As such, the cutting may section the hose into a first hose section and a second hose section. Furthermore, the cutting may section the displacement inhibiting device/region into a first displacement inhibiting device/region section and a second displacement inhibiting device/region section. Each of the aforementioned sections may have a cut end revealing a cut cross-section as a result of the cutting/sectioning.

As touched upon above, the ring of tensioned material may exert a (first) radial force onto the tube encasement. As such, the ring of tensioned material may be termed a "(annular) tensioning device." The ring of tensioned material may likewise induce a (second) radial force from the tube encasement onto the tube. The (first) radial force may be (substantially) uniform along an entire inner circumference of the ring of tensioned material. For example, each point on an inner circumference of the ring of tensioned material may apply (substantially) the same, radial force onto the tube encasement. Similarly, the (second) radial force may be (substantially) uniform along an entire inner circumference of the tube encasement.

As will be apparent to the skilled reader, the ring of tensioned material may exert a radial force onto the tube encasement and induce a radial force from the tube encasement onto the tube even after the ring of tensioned material, the tube encasement and the tube have been cut. For the sake of better legibility, the term "(first/second) tensioning device section" will be used in the following paragraphs in lieu of the cumbersome term "first/second displacement inhibiting device/region section." In other words, the term "(first/second) tensioning device section" will be used to designate the "first/second displacement inhibiting device/region section" of a cut ring of tensioned material.

The first tensioning device section may apply a (third) radial force onto the first tube encasement section and may induce a (fourth) radial force from the first tube encasement section onto the first tube section. Similarly, the second tensioning device section may apply a (fifth) radial force onto the second tube encasement section and may induce a (sixth) radial force from the second tube encasement section onto the second tube section. The third/fifth radial force may be equal to the aforementioned first radial force. Similarly, the fourth/sixth radial force may be equal to the aforementioned second radial force.

As will be apparent to the skilled reader, the teachings of the present disclosure may apply to any section of the tube encasement and any section of the tube. In other words, the teachings may apply to any section of hose. Furthermore, the person skilled in the art will recognize that any "section of hose" constitutes a "hose," just as any section of tube encasement constitutes a "tube encasement" and any section of tube constitutes a "tube." Thus, whereas the aforementioned (third/fourth) radial forces may be exerted/induced at a first end of a section of hose, radial forces equivalent to the aforementioned (fifth/sixth) radial forces may be exerted/induced by a respective section of a ring of tensioned material at a second, opposite end of that (same) section of hose. Similarly, whereas the aforementioned (fifth/sixth) radial forces may be exerted/induced at a second end of a section of hose, radial forces equivalent to the aforementioned (third/fourth) radial forces may be exerted/induced by a respective section of a ring of tensioned material at a first, opposite end of that (same) section of hose.

The aforementioned (first) radial force from the ring of tensioned material onto the tube encasement may (in cooperation with a coefficient of friction between the ring of tensioned material and the tube encasement) prevent displacement of the ring of tensioned material relative to the tube encasement, e.g. in a longitudinal direction of the tube encasement. For example, the (first) radial force may be large enough to prevent such displacement during cutting of the ring of tensioned material, the tube encasement and the tube. Similarly, the (third/fifth) radial force from the first/second tensioning device section onto the first/second tube encasement section may (in cooperation with a coefficient of friction between the first/second tensioning device section and the first/second tube encasement section) prevent displacement of the first/second tensioning device section relative to the first/second tube encasement section, e.g. in a longitudinal direction of the first/second tube encasement section. Likewise, the (fourth/sixth) radial force from the first/second tube encasement section onto the first/second tube section may, in cooperation with a coefficient of friction between the first/second tube encasement section and the first/second tube section, prevent displacement of the first/second tube encasement section relative to the first/second tube section, e.g. in a longitudinal direction of the first/second tube section. For example, the (third/fourth/fifth/sixth) radial force may be large enough to prevent such displacement during the activities typically necessary to mount a tube section and a tube encasement section to a sanitary fitting. Similarly, the (third/fourth/fifth/sixth) radial force may be large enough to prevent such displacement during the activities typically necessary to assemble a tube section, a tube encasement section and other components such as sleeves and/or couplings into a (sanitary) hose, e.g. a hose for watertight connection of a kitchen, bathroom, laundry room or utility room fixture (e.g. a sink faucet), a washing machine or dishwasher to a (wall-mounted) faucet. (Such assembly will be described in further detail below.) Inter alia, the (third/fourth/fifth/sixth) radial force may be large enough to prevent such displacement when the first/second tube encasement section and the first/second tube section are bent at a radius of curvature of 50 mm, e.g. when the first/second tube encasement section and the first/second tube section are bent (from a straight configuration) to a configuration in which the longitudinal axis of the first/second tube (encasement) section comprises a curved portion having a radius of curvature of 50 mm. Similarly, the (third/fourth/fifth/sixth) radial force may be large enough to prevent such displacement when the first/second tube encasement section and the first/second tube section are bent by any one of 45° and 90°, e.g. from end to end. The (prevented) displacement may be a (prevented) displacement at a location of the (respective, i.e. first/second/third/fourth/fifth/sixth) radial force. Similarly, the (prevented) displacement may be a (prevented) displacement at a (respective) cut cross-section of the tensioning device section/tube encasement section/tube section.

A product of the (first) radial force and a coefficient of friction between an inner circumference of the ring of tensioned material and an outer circumference of the tube encasement at a location of the (first) radial force may be greater than at least one of 5 newton, 10 newton and 50 newton. Similarly, a product of the (second) radial force and a coefficient of friction between an inner circumference of the tube encasement and an outer circumference of the tube at a location of the (second) radial force may be greater than at least one of 5 newton, 10 newton and 50 newton. A product of the (third/fifth) radial force and a coefficient of friction between an inner circumference of the first/second tensioning device section and an outer circumference of the first/second tube encasement section at a location of the (third/fifth) radial force may be greater than at least one of 5 newton, 10 newton and 50 newton. Similarly, a product of the (fourth/sixth) radial force and a coefficient of friction between an inner circumference of the first/second tube encasement section and an outer circumference of the first/second tube section at a location of the (fourth/sixth) radial force may be greater than at least one of 5 newton, 10 newton and 50 newton.

The first/second tube section may be displaceable relative to the first/second tube encasement section over at least 80%, 90% or 95% of a length from a first (cut) end of the first/second tube section to a second end of the first/second tube section. For example, the first/second tube section may be fixed to the first/second tube encasement section at the most distal 5% (2.5% or 10%) at each end of the first/second tube section and be displaceable relative to one another everywhere else. The cut end of the first/second tube section may be fixed to the cut end of the first/second tube encasement section by virtue of the radial force induced by the tensioning device section.

The method may comprise attaching a connector to a first end of the hose section. Similarly, the method may comprise attaching a(nother) connector to a second end of the hose section. The connector may be of a construction that allows formation of a watertight connection with a mating connector. In this respect, the connector may comprise a connecting portion (that connects to/mates with a corresponding (connecting) portion of the mating connector). For example, the connector may comprise (a connecting portion having) a male or female thread, e.g. a thread of a size (and pitch) that mates with a (standard) thread of conventional/commonplace kitchen, bathroom, laundry room or utility room faucets. The thread may be a male thread selected from the group consisting of M8×1, M10×1, M12×1, ⅜" and ½". Similarly, the connector may comprise a (rotatable) union nut having a female thread selected from the group consisting of 9/16", ⅜", ½", ½-NPSM, ¾". The connecting portion may be a snap fitting, i.e. a connecting portion that forms a snap-fit with a corresponding (connecting) portion of a mating connector. The connecting portion of the connector may be made of brass or stainless steel. The connector may comprise a sealing part, e.g. a washer or O-ring. The sealing part may be made of rubber or plastic. The sealing part may be configured to sealingly fill a gap between the connector and a mating connector when the connector is matingly fastened to the mating connector. The connector may be attached to the hose section such that the connector forms a watertight connection between the lumen of the tube section of the hose section and a lumen of the connector. The connector may comprise an insert portion. The method may comprise inserting an insert portion of a connector into the lumen of the tube. The insert portion may be made of brass or stainless steel. The insert portion may have a (circular) cylindrical shape. The insert portion may comprise one or more ridges/ridge portions, each ridge (portion) extending circumferentially around an entire outer circumference of the insert portion. The insert portion may comprise a tapered portion/frustoconical region at an end of the insert portion, e.g. to ease insertion of the insert portion into a lumen of the tube. Any of the ridges/ridge portions may be of a diameter that is larger than a diameter of an inner circumference of the tube. As such, any of the ridges/ridge portions may form a watertight seal with an inner circumference of the tube. One or more portions of the insert portion adjacent a (respective) ridge (portion) may be of a diameter that is (substantially) identical to/falls in a range of 95% to 100% of a diameter of an inner circumference of the tube. The insert portion may have a length in the range of 10 mm to 25 mm.

The method may comprise assembling an end piece onto a first (cut) end of the hose section. Similarly, the method may comprise assembling an(other) end piece onto a second (cut) end of the hose section. For example, the method may comprise inserting a (first/second) cut end of the first/second displacement inhibiting device/region section, the first/second tube encasement section and the first/second tube section into an orifice of a (protective) end piece. The end piece may be of metal or of a heat-shrinkable plastic. The end piece may comprise a sleeve portion, e.g. a sleeve portion having a (circular) cylindrical shape. The sleeve portion may have a tubular shape and may be termed a "tubular portion." The sleeve portion may form an orifice that receives the (cut) end of the hose section. The sleeve portion may have a length in the range of 10 mm to 25 mm. The sleeve portion may be of a length long enough to cover the first/second tensioning device section. The sleeve portion may have a (radial) thickness in the range of 0.1 mm to 0.5 mm. The sleeve portion may have an inner diameter that falls in a range of 100% to 110% of a diameter of an outer circumference of the tube encasement. The sleeve portion may have an inner circumference that (matingly) receives at least part of an outer circumference of the first/second displacement inhibiting device/region section. The end piece may comprise an (annular) abutment wall. The abutment wall may partially close an end of the sleeve portion. The abutment wall may comprise a (circular) opening, e.g. in a central portion of the abutment wall. The opening may oppose the lumen of the respective (cut) end of the hose, i.e. of the tube of the hose, e.g. when the end of the hose is fully inserted into the end piece/abuts the abutment wall. The assembling may comprise moving at least one of the end of the hose section and the end piece until at least one of a (corresponding) end of the tube encasement section and a (corresponding) end of the tube section abuts the abutment wall. The method may comprise affixing the end piece to the hose section in such an abutting arrangement.

The displacement inhibiting device/region section may be (fabricated and) cut such that the first/second displacement inhibiting device/region section extends out of the sleeve portion when the (cut) end of the hose (i.e. the first/second displacement inhibiting device/region section, the first/second tube encasement section and the first/second tube section) is fully inserted into the end piece/abuts the abutment wall. In this respect, the depth of the orifice (that may equal the length of the sleeve portion) may be less that a width of the first/second displacement inhibiting device/region section in a longitudinal direction of the first/second tube section.

The (sleeve portion of the) end piece may be clamped, crimped or otherwise frictionally affixed to an outer circumference of the hose section, e.g. to an outer circumference of the (first/second) displacement inhibiting device/region section. Similarly, the inner circumference of the sleeve portion of the end piece may comprise teeth, hooks or projections that resist retraction of the end piece from the hose section. Any of the teeth, hooks and projections may resiliently extend from the inner circumference of the sleeve portion of the end piece. The assembling may comprise dropping the end piece onto the end of the hose, e.g. using (solely) the force of gravity.

The method may comprise forming a bond between the end piece, the tube encasement, the tube and an insert portion (of a connector), e.g. an insert portion positioned in a lumen of the tube. For example, the method may comprise (forming the bond by) crimping the end piece, e.g. with a pressure in the range of $10^5$ to $10^7$ Newton/m$^2$. The crimping pressure may be chosen such that a radial force induced by (the crimped portion of) the end piece from the tube onto the insert portion creates a watertight seal between the lumen of the tube and the lumen of the insert portion without compromising the long-term durability of the portion of the tube compressed by (the crimped portion of) the end piece. Similarly, the crimping pressure may be chosen such that a product of the radial force induced by (the crimped portion of) the end piece from the tube onto the insert portion and the coefficient of friction between the tube and the insert portion yields a longitudinal restraining force of at least 50 or at least 100 Newton. The method may likewise comprise (forming the bond by) shrinking the end piece, e.g. by applying heat to the end piece. The end piece and the shrinking process may be designed to induce a radial force as described above.

The insert portion of the connector may be inserted into the lumen of the tube through an opening in the abutment wall of the end piece. As such, the method may comprise inserting an end of the hose section into the end piece, then inserting the insert portion of the connector into the lumen of the tube and then forming the bond between the end piece, the tube encasement, the tube and the insert portion. In other words, the method may comprise effecting the aforementioned steps in the aforementioned order.

As touched upon supra, the displacement inhibiting device/region serves to inhibit fraying (of the braided strands) of the tube encasement, e.g. during/subsequent to sectioning of the tube encasement. Furthermore, the displacement inhibiting device/region may serve to inhibit longitudinal displacement of the tube encasement relative to the tube. Accordingly, other measures may be taken to ensure that longitudinal displacement of the tube encasement relative to the tube is inhibited regardless of the utility of the displacement inhibiting device/region in this respect.

The method may comprise gripping the tube encasement from a point in time prior to the (aforementioned) cutting to a point in time subsequent to the (aforementioned) forming of a bond (between the end piece, the tube encasement, the tube and the insert portion). The gripping may prevent (e.g. induce a radial force that prevents) displacement of the tube encasement relative to the tube. The radial force may be a radial force as described above. The gripping may prevent a cut end of the tube encasement (section) from becoming longitudinally offset relative to a cut end of the tube (section) by more than 0.5 mm or by more than 1 mm. The gripping may be effected at a distance of no less than 20 mm, no less than 30 mm or no less than 40 mm from a location of the cut through the tube encasement. Similarly, (a portion of) the gripping may be effected at a distance of no more than 120 mm, no more than 100 mm, no more than 70 mm or no more than 50 mm from a location of the cut through the tube encasement. For example, a distance between the cut and the gripped region (of the tube encasement) most proximate to the cut may be less than 120 mm, less than 100 mm, less than 70 mm or less than 50 mm. The gripping may be effected by a gripping device.

While the teachings of the present disclosure have been discussed hereinabove mainly in the form of a method, the teachings may be embodied, mutatis mutandis, in the form of a manufacture, i.e. in the form of a hose. For example, the hose may be a (section of) hose obtained by a process comprising any elements (i.e. actions) of the aforementioned method. Similarly, the hose may be a (section of) hose as described above in the context of a method. (As touched upon above, any "section of hose" likewise constitutes a "hose.") Specifically, the hose may comprise a tube, a (braided/wound) tube encasement and a ring of tensioned material as described above. Similarly, the hose may comprise a tube, a (braided/wound) tube encasement and a ring of bonded material as described above. The hose may furthermore comprise at least one of a connector and an end piece as described above.

For example, the hose may comprise a tube, a (braided/wound) tube encasement, a ring of tensioned material as well as, at each end of the hose, a respective connector and a respective end piece, each end piece forming a bond between the respective end piece, the tube encasement, the tube and a respective insert portion of the respective connector positioned in the lumen of the tube. Similarly, the hose may comprise a tube, a (braided/wound) tube encasement, a ring of bonded material as well as, at each end of the hose, a respective connector and a respective end piece, each end piece forming a bond between the respective end piece, the tube encasement, the tube and a respective insert portion of the respective connector positioned in the lumen of the tube.

In a further aspect, the teachings of the present disclosure may be embodied, mutatis mutandis, in the form of a system, e.g. in the form of a system for sectioning a hose comprising a tube and a (braided/wound) tube encasement or, more broadly, in the form of a system for manufacturing a hose. Many features of such a system have already been touched upon supra and will be elucidated in further detail hereinbelow.

The system may comprise a wrapping device that forms a displacement inhibiting device/region, e.g. on an outer circumference of a (braided/wound) tube encasement (that encases a tube). The displacement inhibiting device/region may be (formed by) a material wrapped around an outer circumference of a (braided/wound) tube encasement or a ring of tensioned material. As such, the wrapping device may be a wrapping device that wraps a material around an outer circumference of a (braided/wound) tube encasement. Similarly, the wrapping device may be a wrapping device that forms a ring of tensioned material by wrapping a tensioned material around an outer circumference of a (braided/wound) tube encasement. As such, the wrapping device may comprise a tensioning mechanism for tensioning the material. The wrapping device may comprise a rotary carriage on which at least one of the tensioning mechanism and a supply (roll) of the material are mounted. The rotary carriage may comprise a central opening through which the tube and the tube encasement pass/are fed. The wrapping device may comprise a pressing device, e.g. for securing an end of the material during at least part of the wrapping operation.

As with all elements of the system, the wrapping device and its operation has been partially described in the context of a method supra, whence the present disclosure of the wrapping device (or any other element of the system) and its operation is to be read in conjunction with the features already taught in the context of a method. For example, the ring of tensioned material may apply/induce one or more radial forces as described above.

The system may comprise a shrink-processing device that processes a wrapped strip of material into a ring of tensioned material. The shrink-processing device may comprise one or more heating elements selected from the group consisting of electrical heating elements, infrared heating elements, ultrasonic heating elements and (gas) burner elements. The heating elements may be arranged around a volume through which the tube and the tube encasement pass/are fed. The shrink-processing device may be arranged adjacent to the wrapping device.

The system may comprise a bond-forming device that forms a ring of bonded material, e.g. at an outer circumference of a (braided/wound) tube encasement. The ring of bonded material may constitute a displacement inhibiting device/region. The ring of bonded material may form a bond between the tube encasement and the tube, e.g. by extending from the outer circumference of the tube encasement to the tube.

The ring of bonded material may be formed by applying (e.g. injecting, brushing and/or spraying) a bonding material into/onto the outer circumference of the tube encasement. As such, the bond-forming device may comprise one or more (bonding material) application devices selected from the group consisting of injection nozzles, brushes and spray nozzles. The injection/spray nozzles may be in fluid connection with a reservoir (of bonding material), e.g. via a pump that pressurizes the bonding material for expulsion via the injection/spray nozzles (into/onto the outer circumference of the tube encasement). The injection/spray nozzles may be arranged around a volume through which the tube and the tube encasement pass/are fed. Similarly, one or more of the spray nozzles may spray the bonding material onto respective brushes that brush the bonding material onto the outer circumference of the tube encasement. The brushes may likewise be dipped into the reservoir of bonding material and then brush the bonding material onto the outer circumference of the tube encasement. The bonding material may bond a plurality of strands of the tube encasement into a unitary structure, i.e. into the ring of bonded material. The bonding material may be an adhesive. The bonding material may be a hot-melt adhesive, e.g. an adhesive comprising a thermoplastic such as ethylene-vinyl acetate. As such, the bond-forming device may comprise a melting device that melts the bonding material, e.g. before the bonding material is (pressurized and) injected/sprayed/brushed (into/onto the outer circumference of the tube encasement). Similarly, the bonding material may be an ultraviolet light curing adhesive. As such, the bond-forming device may comprise a cooling device such as a fan that cools the bonding material applied to the tube encasement. Similarly, the bond-forming device may comprise an ultraviolet irradiation device such as an ultraviolet light that cures the bonding material applied to the tube encasement by irradiating the bonding material with ultraviolet radiation.

The ring of bonded material may be formed by melting a portion of the tube encasement, e.g. by melting (and actively/passively cooling) a plurality of strands of the tube encasement into a unitary structure. As such, the bond-forming device may comprise one or more melting devices that effect the melting by application of heat or ultrasonic energy to the strands. For example, the bond-forming device may comprise a hot/ultrasonic press, e.g. a press having a plurality of heated/ultrasonic jaws that effect a melting and clamping around an outer circumference of the tube encasement.

The wrapping device/bond-forming device may form the displacement inhibiting device/region at a (longitudinal) position where the hose is to be sectioned. As such, the system may comprise a transport mechanism that transports (i.e. feeds) the hose in a longitudinal direction, e.g. into/through an operating space of the bond-forming device. For example, the transport mechanism may transport the hose into/through the aforementioned volume of the bond-forming device. The system may comprise a controller that controls and/or receives feedback from the transport mechanism. As such, the controller may receive/store data indicative of a longitudinal position of the hose. Similarly, the controller may instruct the transport mechanism to transport the hose to a longitudinal position (specified by a corresponding instruction). The controller may coordinate operation of the transport mechanism and the wrapping device/bond-forming device such that the displacement inhibiting device/region is formed at a (longitudinal) position where the hose is to be sectioned, e.g. at a user-specified distance from an adjacent displacement inhibiting device/region. For example, the controller may instruct the wrapping device/bond-forming device to form the displacement inhibiting device/region after the controller has instructed the transport mechanism to transport the hose to a desired longitudinal position relative to the wrapping device/bond-forming device.

The system may comprise a cutting device that cuts through an entire cross-section of the displacement inhibiting device/region, the tube encasement and a tube encased by the tube encasement. The cutting device may be a knife, a saw or other cutting tool. Similarly, the cutting device may be a heated element capable of melting its way through a cross-section of the displacement inhibiting device/region, the tube encasement and the tube. The system may comprise a cutting machine that comprises the cutting device. The cutting machine may move the cutting device and/or the hose (i.e. the tube and the tube encasement) to effect the cutting (at a desired location).

As touched upon supra, the system may comprise a transport mechanism and a controller. The transport mechanism may transport (i.e. feed) the hose in a longitudinal direction into/through (an operating space of) the cutting mechanism. The controller may coordinate operation of the transport mechanism and the cutting mechanism such that the cutting device cuts the hose at a (longitudinal) position of the displacement inhibiting device/region. The cutting may be effected in a central third of the displacement inhibiting device/region as determined in a longitudinal direction.

The system may comprise a user input device, e.g. a keyboard or a knob, for receiving a user input indicative of a (desired) distance between adjacent displacement inhibiting devices/regions (in a longitudinal direction along the hose). The controller may use the user input as a parameter for coordinating operation of the transport mechanism and the wrapping device/bond-forming device. Similarly, the controller may use the user input as a parameter for coordinating operation of the transport mechanism and the cutting mechanism, e.g. for effecting the cutting at a (longitudinal) position of the displacement inhibiting device/region.

The controller may store data indicative of a distance between the wrapping device/bond-forming device. The controller may use the stored data to coordinate operation of the transport mechanism and the wrapping device/bond-forming device, e.g. to ensure that the cutting is effected at a (longitudinal) position of the displacement inhibiting device/region. Similarly, the system may comprise a sensor that detects (a position of) the displacement inhibiting device/region. The controller may use an output of the sensor indicative of (a position of) the displacement inhibiting device/region to coordinate operation of the transport mechanism and the wrapping device/bond-forming device, e.g. to ensure that the cutting is effected at a (longitudinal) position of the displacement inhibiting device/region.

The system may comprise a (first) assembly device that assembles an end piece onto a (first) cut end of the hose (section) (i.e. a (first) cut end of the tube (section) and the tube encasement (section)). The system may comprise a (second) assembly device that assembles an end piece onto a (second) cut end of the hose (section) (i.e. a (second) cut end of the tube (section) and the tube encasement (section)). The (respective) end piece may be an end piece as described above. The (respective) cut end may be received by an orifice of the (respective) end piece.

The (first/second) assembly device may comprise a (robotic) alignment mechanism that aligns the (respective) cut end of the hose (section) with (the orifice of) the end piece. The (first/second) assembly device may comprise a (robotic) assembly mechanism that moves at least one of the aligned hose (section) and end piece such that the end piece is assembled onto the cut end of the hose (section), e.g. such that the cut end of the hose abuts an abutment wall of the end piece.

The system may comprise a (first) connector assembly device that assembles a (first) connector onto a (first) cut end of the hose (section). The system may comprise a (second) connector assembly device that assembles a (second) connector onto a (second) cut end of the hose (section). The (respective) connector may be a connector as described above. The (first/second) connector assembly device may comprise a (robotic) alignment mechanism that aligns the (respective) cut end of the hose (section) with the connector. The (first/second) connector assembly device may comprise a (robotic) connector assembly mechanism that moves at least one of the aligned hose (section) and connector such that the connector is assembled onto the cut end of the hose (section). For example, the system may comprise a (first) connector insertion device that inserts an insert portion of the (first) connector into a lumen of the tube (section), e.g. at a (first) cut end of the hose (section) (i.e. of the tube (section)). Similarly, the system may comprise a (second) connector insertion device that inserts an insert portion of the (second) connector into the lumen of the tube (section), e.g. at a (second) cut end of the hose (section).

The system may comprise a (first/second) end piece processing device that processes the (respective) end piece to form a bond between the (respective) end piece, the tube encasement (section), the tube (section) and (the insert portion of) the (respective) connector, e.g. the insert portion positioned in the lumen of the tube (section). The (first/second) end piece processing device may form the bond by crimping the end piece, e.g. as discussed above. In this respect, the (first/second) end piece processing device may comprise a press having a plurality of radially movable jaws that effect a crimping around an outer circumference of the end piece. Similarly, the (first/second) end piece processing device may form the bond by shrinking the end piece, e.g. by applying heat to the end piece. In this respect, the (first/second) end piece processing device may comprise one or more heating elements selected from the group consisting of electrical heating elements, infrared heating elements, ultrasonic heating elements and (gas) burner elements. The heating elements may be arranged around a volume where the end piece (assembled on an end of the hose (section)) is (temporarily) positioned.

The system may comprise a gripping device. The gripping device may grip the tube encasement (section) from a point in time prior to the (aforementioned) cutting to a point in time subsequent to the (aforementioned) forming of a bond (between the end piece, the tube encasement, the tube and the connector). In other words, the gripping device may grip the tube encasement (section) as the transport mechanism transports the hose (section) between various "stations" of the system, e.g. between the cutting device and the end piece processing device. The gripping may prevent (e.g. induce a radial force that prevents) displacement of the tube encasement relative to the tube. The radial force may be a radial force as described above. The gripping may prevent a cut end of the tube encasement (section) from becoming longitudinally offset relative to a cut end of the tube (section) by more than 0.5 mm or by more than 1 mm. The gripping device may grip the tube encasement (section) at a distance of no less than 20 mm, no less than 30 mm or no less than 40 mm from a location of the cut through the tube encasement. Similarly, (a portion of) the gripping device may grip the tube encasement (section) at a distance of no more than 120 mm, no more than 100 mm, no more than 70 mm or no more than 50 mm from a location of the cut through the tube encasement. For example, a distance between the cut and a contact point of the gripping device and the tube encasement most proximate to the cut may be less than 120 mm, less than 100 mm, less than 70 mm or less than 50 mm.

The gripping device may comprise a plurality of gripping mechanisms. The gripping mechanisms may operate/be operated cooperatively to effect the gripping described above. For example, a first gripping mechanism may grip the tube encasement proximate to a respective end of the hose (section) while the hose (section) is transported from a first location to a second location and/or undergoes a processing operation. A second gripping mechanism may grip the tube encasement proximate to the respective end of the hose (section) while the hose (section) is transported from the second location to a third location and/or undergoes another processing operation. Operation of the gripping mechanisms may be coordinated such that (from a first gripping mechanism to a final gripping mechanism in sequence (as defined by the system)) a respective gripping mechanism does not release (its grip on) the tube encasement until another gripping mechanism grips the tube encasement. Any of the gripping mechanisms may cooperate with any other elements of the system, e.g. with the transport mechanism, the (end piece) assembly device and/or the connector assembly device, to effect transport, movement, alignment, etc. of the hose (section). The controller may control operation of the gripping device, in particular operation of any of the gripping mechanisms.

The system may comprise a tube fabricating device that fabricates the tube, e.g. from a reservoir of fluid plastic material or pellets of plastic material. The tube fabricating device may comprise an extruder that presses the tube material through a nozzle (having a (substantially) annular cross-section) to form a (substantially) cylindrical tube (that may constitute the tube that is the fundamental subject of the present disclosure). The nozzle may comprise a protrusion that reduces a radial cross-section of the nozzle (e.g. by 20% to 50%) so as to form a groove in the outer circumference of the extruded tube. The groove may have a width (in a circumferential direction) in the range of 1 to 3 mm. The nozzle/protrusion may be rotated to form a spiral (e.g. helical) groove in the outer circumference of the extruded tube, e.g. as described above. The tube fabricating device may comprise a molding device that molds the wall of the extruded tube. For example, the molding device may mold the wall of the extruded tube into a corrugated form, e.g. as described above. The molding device may comprise a plurality of forms arranged in the fashion of a caterpillar tread. The "tread" may "roll" along the outer circumference of the extruded tube, thus allowing the wall of the tube to be molded in a continuous process, e.g. at the speed of the tube extrusion.

The system may comprise a tube encasement fabricating device that fabricates the tube encasement, e.g. as described above. For example, the system may comprise a tube encasement fabricating device in the form of a braiding device that forms the tube encasement by braiding a plurality of strands around the tube. The braiding device may comprise a tube transport mechanism that transports the tube (in a longitudinal direction) in synch with the braiding of the tube encasement. The braiding device may comprise a plurality of bobbins, each bobbin having a single strand or a group of (e.g. 2 to 6) strands wound thereon. As such, the system may comprise one or more bobbin winding machines that wind a single strand or a group of strands onto respective bobbins. The braiding device may (selectively) braid the strands in one of a biaxial and a triaxial braiding pattern, e.g. in accordance with a user selection.

In the case of a biaxial braiding pattern, the plurality of bobbins may be divided into two equal sets that are weavingly counter-rotated (e.g. in the fashion of a "Maypole dance"). As such, the braiding device may comprise a plurality of counter-rotating wheels/cogs that (directly or indirectly) engage and transport the bobbins. The braiding device may comprise a plurality of lifting arms that respectively lift the strands of the one set of bobbins "over" the strands of the other, counter-rotating bobbins and vice-versa, thus allowing each set of bobbins to be rotated in a plane around the tube.

In the case of a triaxial braiding pattern, the plurality of bobbins may comprise two equal sets of bobbins as well as a third set of bobbins. The braiding device may braid the strands of the two equal sets of bobbins as described above for a biaxial braiding pattern and may braid the strands of the third set of bobbins into the strands of the two equal sets of bobbins such that the strands of the third set of bobbins extend longitudinally along the tube. As such, the bobbins of the third set of bobbins may be mounted in a fixed position in the braiding device, whereas braiding device may counter-rotate the bobbins of the two equal sets of bobbins around the tube.

Similarly, the system may comprise a tube encasement fabricating device in the form of a wrapping device that forms the tube encasement by wrapping (one or more layers of) a material around the tube, e.g. as described supra. The wrapping device may comprise a tube transport mechanism that transports the tube (in a longitudinal direction) in synch with the wrapping of the material around the tube. The wrapping device may comprise a plurality of bobbins, each bobbin having a strip of material, a single strand or a group of (e.g. 2 to 6) strands of material wound thereon. As such, the system may comprise one or more bobbin winding machines that wind a strip of material, a single strand or a group of strands of the material onto respective bobbins. The wrapping device may comprise one or more mechanisms that rotate a respective set of the bobbins circumferentially around the tube to effect the wrapping. The wrapping device may comprise one or more mechanisms that tension the material as it is wrapped around the tube, e.g. by braking rotation of the bobbins or by otherwise inhibiting feed of the material.

The system may constitute an assembly line. In this respect, as touched upon above, the system may comprise a transport mechanism. The transport mechanism may transport the tube from the tube fabricating device to the braiding device. Similarly, the transport mechanism may transport the tube and the tube encasement (i.e. the hose) from the braiding device to the wrapping device. The transport mechanism may transport the tube and the tube encasement from the wrapping device to the cutting device, e.g. via the shrink-processing device. Similarly, the transport mechanism may transport the tube and the tube encasement (i.e. the hose) from the braiding device to the bond-forming device. The transport mechanism may transport the tube and the tube encasement from the bonding device to the cutting device. The transport mechanism may transport the tube (section) and the tube encasement (section) (i.e. the hose (section)) from the cutting device to the (first) assembly device that assembles an end piece onto a (first) cut end of the hose (section). The transport mechanism may transport the hose (section) from the (first) assembly device to the (first) connector assembly device. The transport mechanism may transport the hose (section) from the (first) connector assembly device to the (first) end piece processing device. The transport mechanism may transport the hose (section) from the (first) end piece processing device to the (second) assembly device that assembles an end piece onto a (second) cut end of the hose (section). The transport mechanism may transport the hose (section) from the (second) assembly device to the (second) connector assembly device. The transport mechanism may transport the hose (section) from the (second) connector assembly device to the (second) end piece processing device. Any of the aforementioned operations of transporting the tube (section)/the hose (section) may be effected mechanically/robotically, e.g. using one or more elements selected from the group of rollers, gripping devices, carousels, etc. Any of the aforementioned operations of transporting the tube (section)/the hose (section) may be controlled by the controller.

As touched upon above, the tube fabricated by the tube fabricating device may be sectioned into lengths of at least 10 m, at least 30 m or at least 50 m. Similarly, the tube fabricated by the tube fabricating device may be sectioned into lengths of less than 30 m, less than 50 m or less than 100 m. The length of tube may be rolled onto a spool. The tube may be fed from the spool to the braiding device. Similarly, the braid-encased length of tube may be rolled onto a spool. The braid-encased tube may be fed from the spool to the wrapping device/the bond-forming device. By wrapping the (braid-encased) tube onto a spool, differences in processing speed can be compensated. For example, if the tube fabricating device fabricates tube twice as fast the braiding device can form a braided encasement on the tube, the output of the tube fabricating device can be rolled onto spools and the tube on the spools can be used to feed two braiding devices.

Other objects, advantages and novel features of the present invention will become apparent from the following detailed description of the invention when considered in conjunction with the accompanying drawings.

BRIEF DESCRIPTION OF THE DRAWINGS

The novel features of the invention, as well as the invention itself, both as to its structure and its operation will be best understood from the accompanying figures, taken in conjunction with the accompanying description.

The Figures show:

FIGS. 1 to 4 a schematic depiction of an embodiment of a forming of a ring of tensioned material in accordance with the present disclosure;

FIGS. 5 to 8 a schematic depiction of another embodiment of a forming of a ring of tensioned material in accordance with the present disclosure;

FIGS. 9 to 11 a schematic depiction of another embodiment of a forming of a ring of tensioned material in accordance with the present disclosure;

FIGS. 12 to 13 a schematic depiction of an embodiment of sectioning a tube and a tube encasement in accordance with the present disclosure;

FIGS. 14 to 15 a schematic depiction of another embodiment of sectioning a tube and a tube encasement in accordance with the present disclosure;

FIG. 19 a schematic depiction of a partial embodiment of a connector in accordance with the present disclosure;

FIG. 20 a schematic depiction of an embodiment of a hose in accordance with the present disclosure;

DETAILED DESCRIPTION

Figure 18:
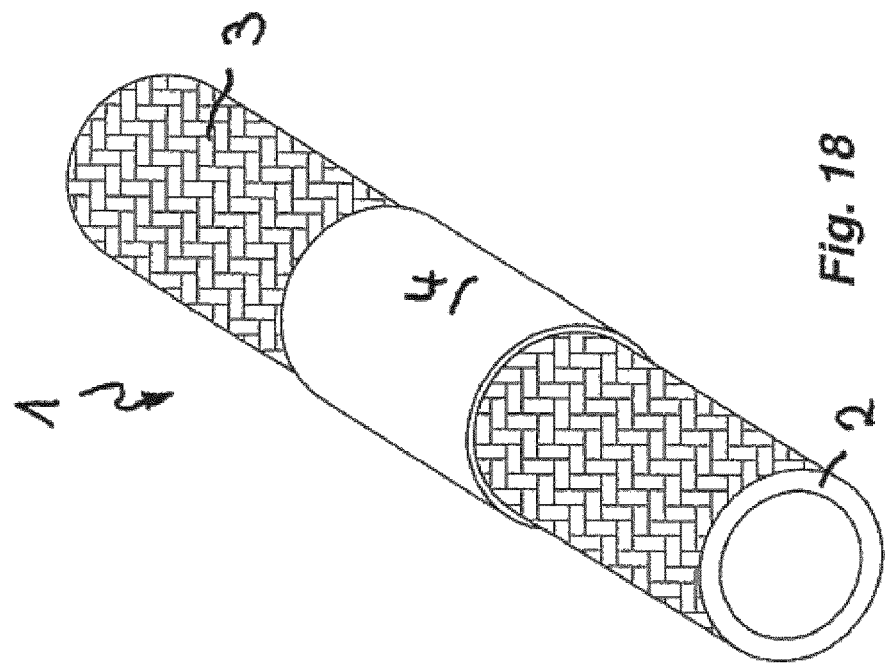
FIG. 18 a schematic depiction of an embodiment of a tube and a tube encasement having a ring of material in accordance with the present disclosure.

FIGS. 1 to 4 schematically depict an embodiment of tube fixation means 4, in particular a forming of a ring of tensioned material, in accordance with the present disclosure, e.g. as described above. In the illustrated embodiment, a material in the form of a strip of material having an adhesive on a single side 9 of the strip is formed into a partial loop around an outer circumference of a hose 1 comprising a tube 2 and a tube encasement 3 that encases the tube 2 (FIG. 1). The loop is closed snuggly around the hose 1 by adhering the adhesive side of a first end 7 of the strip of material to the adhesive side 9 of a second end 8 of the strip of material at a position spaced from the most distal portion of the second end 8 of the strip of material (FIG. 2). The strip of material is folded at a closing point of the loop such that a non-adhesive side of the strip of material at the first end 7 lies against the non-adhesive side of a central portion 6 of the strip of material 4, i.e. against the non-adhesive side of the loop (FIG. 3). The second end 8 of the strip of material 4 is then tensioned and its adhesive side is affixed to the non-adhesive side of the central portion 6 of the strip of material 4, i.e. against the non-adhesive side of the loop (FIG. 4).

FIGS. 5 to 8 schematically depict another embodiment of tube fixation means 4, in particular a forming of a ring of tensioned material, in accordance with the present disclosure, e.g. as described above. In the illustrated embodiment, a first end 10 of a strip of material having an adhesive on a single side 9 of the strip is affixed, by means of the adhesive, onto an outer circumference of a hose 1 comprising a tube 2 and a tube encasement 3 that encases the tube 2 (FIG. 1). The strip of material is tensioned and wrapped fully around the outer circumference of the hose 1, thus forming a ring of tensioned material (FIG. 2). The strip of material may then be cut to a desired length (FIG. 3) and a second end 11 of the strip of material may be affixed (under tension) to an outer circumference of the ring of tension material by means of the adhesive.

FIGS. 9 to 11 schematically depict another embodiment of tube fixation means 4, in particular a forming/positioning of a ring of material around a tube encasement 3 and altering a diameter of the ring of material, in accordance with the present disclosure, e.g. as described above. In the illustrated embodiment, a ring of a heat-shrinkable material is formed (e.g. wrapped) or positioned on an outer circumference of a hose 1 comprising a tube 2 and a tube encasement 3 that encases the tube 2 (FIG. 1). The ring of a heat-shrinkable material is then heated (FIG. 2), which causes the ring of material to alter its diameter by shrinking, the supplying a radial force onto the outer circumference of the tube encasement 3 and inducing the radial force from the tube encasement 3 onto the tube 2 (FIG. 3).

FIGS. 12 to 13 schematically depict an embodiment of sectioning a tube and a tube encasement in accordance with the present disclosure, e.g. as described above. In the illustrated embodiment, a knife 12 is used to section a tube and a tube encasement of a hose 1 through a tube fixation means 4 that has been positioned over an outer circumference of the hose 1 and that effects a radial force onto the hose 1.

FIGS. 14 to 15 schematically depict an embodiment of sectioning a tube and a tube encasement in accordance with the present disclosure, e.g. as described above. In the illustrated embodiment, a heating tool 13 having a heated element is used to section a tube and a tube encasement of a hose 2 through a tube fixation means 4 that has been positioned over an outer circumference of the hose 1 and that effects a radial force onto the hose 1.

Figure 17:
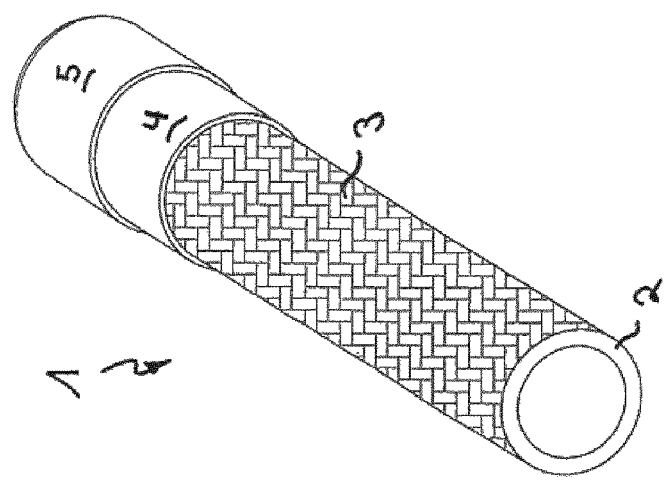
FIGS. 16 to 17 a schematic depiction of an embodiment of a tube section and a tube encasement section in accordance with the present disclosure.
Figure 16:
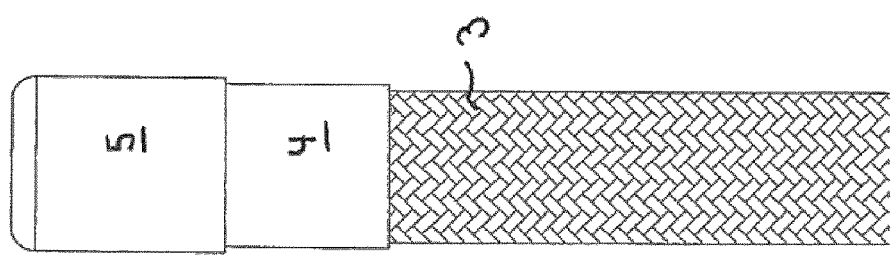

FIGS. 16 to 17 schematically depict an embodiment of a tube section 2 and a tube encasement section 3 in accordance with the present disclosure, e.g. as described above. In the illustrated embodiment, a cut end of a tube section 2, a tube encasement section 3 and a section of a tube fixation means 4 forming a section of hose 1 is fitted with a protective end piece 5 that extends over part of an outer circumference of the tube section 2, the tube encasement section 3 and the section of tube fixation means 4. In particular, the Figures show how the section of tube fixation means 4 has a width that is larger than the depth of an orifice of the end piece 5 into which the cut end of the section of hose 1 is (fully) inserted.

FIG. 18 schematically depicts an embodiment of a tube 2 and a tube encasement 3 provided with tube fixation means 4, in particular a ring of (bonding) material, in accordance with the present disclosure, e.g. as described above. In the illustrated embodiment, the ring of material has been sprayed onto an outer circumference of a hose 1 comprising a tube 2 and a tube encasement 3 that encases the tube 2. The ring of material forms a full circle/ring around an outer circumference of the tube encasement 3.

FIG. 19 schematically depicts a partial embodiment of a connector in accordance with the present disclosure, e.g. as described above. In the illustrated embodiment, the connector is shown as comprising an insert portion 161, a flange 164 and a seal 165. Insert portion 161 is shown as comprising a tapered portion 162 of frustoconical shape as well as a plurality of ridges 163.

FIG. 20 schematically depicts, in exploded view, an embodiment of a hose in accordance with the present disclosure, e.g. as described above. In the illustrated embodiment, the hose comprises a braided tube encasement 230, a displacement inhibiting device 240, an end piece 250 and a connector 260. End piece 250 is shown as comprising a tubular sleeve portion 251 and an abutment wall 252, abutment wall 252 comprising an opening 253. Connector 260 is depicted as comprising a first component as shown in FIG. 19 comprising an insert portion 261, a flange 264, a seal 265 and a lumen 266 as well as a second component in the form of a (female) union nut 267 comprising a plurality of threads 268 and an opening 269. Seal 265 has an annular shape and is designed to cooperate with another connector, when mated thereto, to provide a watertight seal around an entire periphery of lumen 266. In this respect, flange 264 is designed to compress seal 265 when connector 260 is mated to the other connector. Union nut 267 has a hexagonal arrangement of planar surfaces on its outer circumference, e.g. for receiving the jaws of a wrench. Threads 268 are provided on an inner circumference of union nut 267, e.g. for allowing union nut 267 to be threaded onto another connector having a male thread. Displacement inhibiting device 240 allows end piece 250 to be accurately positioned onto the (cut) end of tube encasement 230 without jamming. As depicted in the Figure, the material of displacement inhibiting device 240 may be tensioned such that at least part of a structure at the outer circumference of the tube encasement 230 permeates through the tensioned material of the displacement inhibiting device 240. The (cut) end of tube encasement 230 is received by a tubular orifice in sleeve portion 251, the (cut) end being insertable into the tubular orifice until the (cut) end of tube encasement 230 abuts abutment wall 252. In this abutting position, opening 253 is aligned with a lumen of a tube encased by tube encasement 230. Insert portion 261 of connector 260 can then be inserted through opening 269 and opening 253 into the lumen of the tube, the frustoconical tapered portion 162 easing insertion of the insertion portion into the lumen and ridges 163 forming a watertight seal with an inner circumference of the lumen. Sleeve portion 251 can be crimped against an outer circumference of tube encasement 230 to induce a radial force that acts to retain insert portion 261 in the lumen of the tube. When connector 260 is threaded to another connector, union nut 267 exerts a force against flange 264 that compresses seal 265 against the other connector, thus providing a watertight seal around an entire periphery of lumen 266. As such, a watertight path for fluid communication between the other connector and the lumen of the tube is established.

Figures 21, 22:
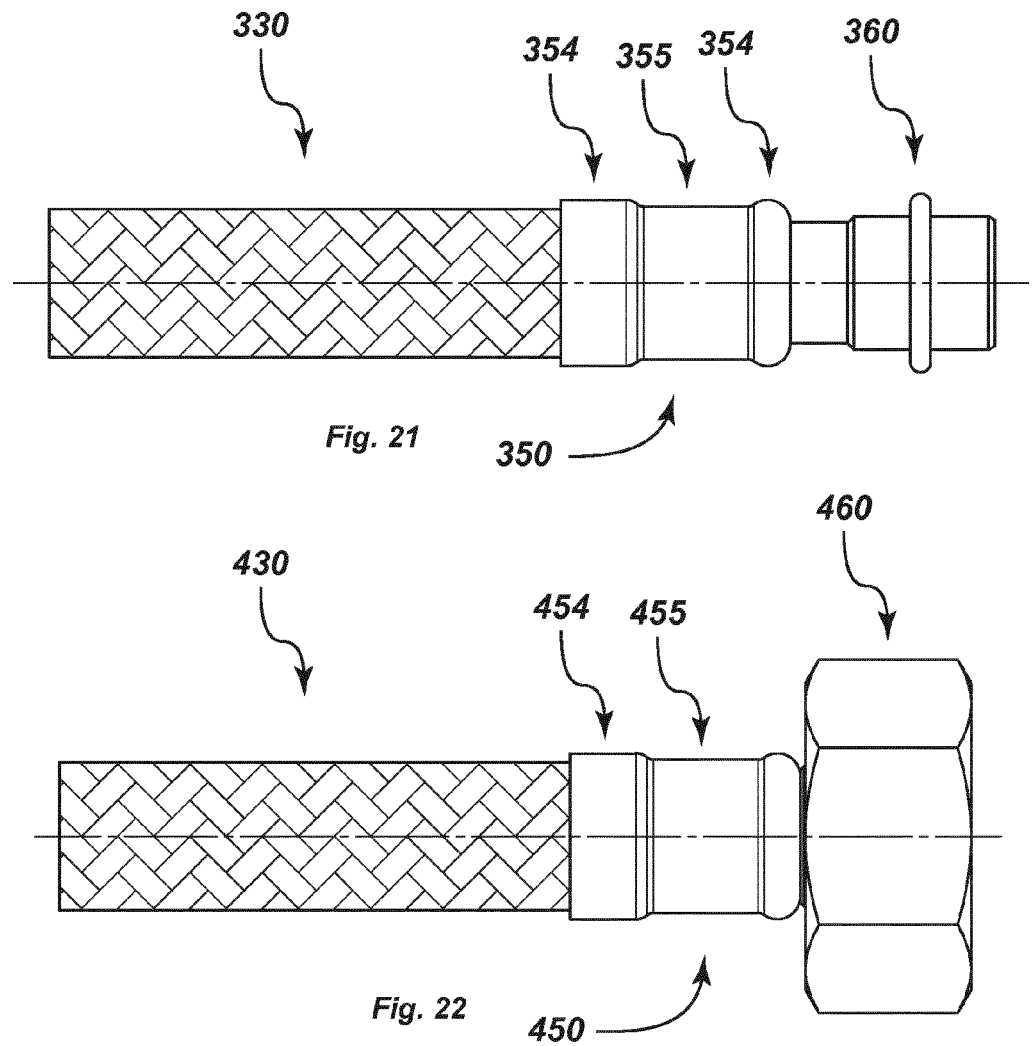
FIG. 21 a schematic depiction of another embodiment of a hose in accordance with the present disclosure.
FIG. 22 a schematic depiction of another embodiment of a hose in accordance with the present disclosure.

FIG. 21 schematically depicts an embodiment of a hose in accordance with the present disclosure, e.g. as described above. In the illustrated embodiment, the hose comprises a braided tube encasement 330, a tubular end piece 350 and a connector 360. End piece 350 comprises two (non-crimped) portions 354 that loosely fit around an outer circumference of braided tube encasement 330 as well as a portion 355 that has been crimped tightly against an outer circumference of braided tube encasement 330. The crimping acts to fasten connector 360 to braided tube encasement 330. In the illustrated embodiment, connector 360 is a snap connector designed to mate with another connector by means of a snap-fit.

FIG. 22 schematically depicts an embodiment of a hose in accordance with the present disclosure, e.g. as described above. In the illustrated embodiment, the hose comprises a braided tube encasement 430, a tubular end piece 450 and a connector 460. End piece 450 comprises a (non-crimped) portions 454 that loosely fits around an outer circumference of braided tube encasement 430 as well as a portion 455 that has been crimped tightly against an outer circumference of braided tube encasement 430. The crimping acts to fasten connector 460 to braided tube encasement 430. In the illustrated embodiment, connector 460 is a threaded connector designed to mate with another connector by means of a threaded connection.

Figure 23A:
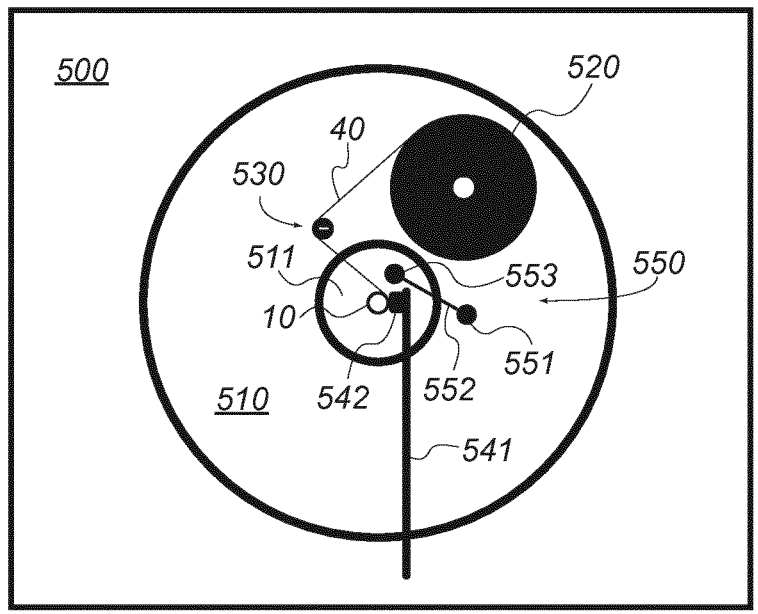
FIGS. 23A and 23B a schematic depiction of an embodiment of a wrapping device in accordance with the present disclosure.
Figure 23B:
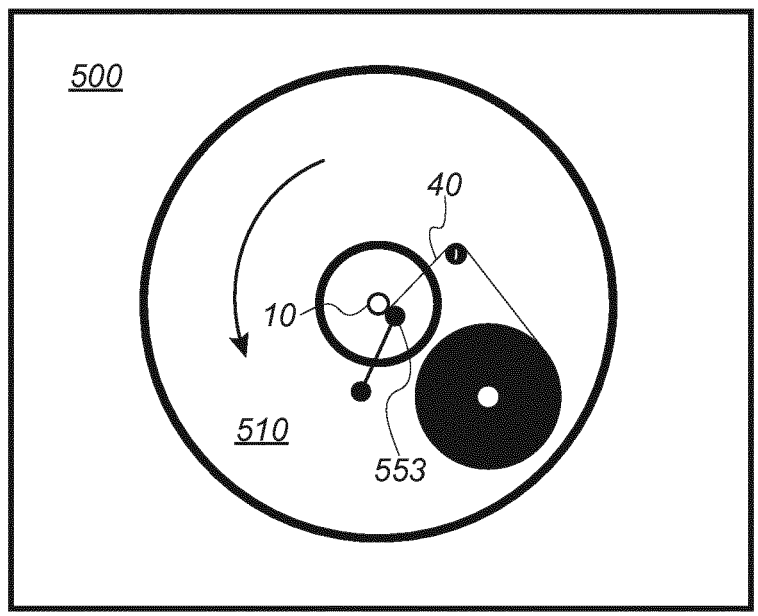

FIGS. 23A and 23B schematically depict an embodiment of a wrapping device 500 in accordance with the present disclosure, e.g. as described above. In the illustrated embodiment, wrapping device 500 comprises a main body 505, a rotary carriage 510 and a pressing device comprising an actuation mechanism 541 and a strip securing portion 542. Rotary carriage 510 is rotatably mounted in main body 505 so as to allow for rotary motion of rotary carriage 510 around a central opening 511 through which a hose 10 (i.e. a tube encased by a (braided/wound) tube encasement) is fed. In the illustrated embodiment, rotary carriage 510 comprises a roller mechanism 550 comprising a pinch roller 553 supported by an actuating rod 552 that connects to rotary carriage at a pivot 551. Rotary carriage 510 supports a supply (roll) 520 of a material 40, e.g. a strip or wire of the material 40, which material 40 is to be wrapped around an outer circumference of hose 10 by wrapping device 500. Rotary carriage 510 moreover supports a tensioning mechanism 530 in the form of a roller. A rotational force required to turn the roller can be adjusted by means of an adjustment screw.

Actuation mechanism 541 is actuable so as to alter the position of strip securing portion 542 such that strip securing portion 542 selectively presses (material 40) against the outer circumference of hose 10. For example, actuation mechanism 541 may be rotated around its longitudinal axis so as to selectively swing strip securing portion 542 into either an active position in which strip securing portion 542 presses toward the outer circumference of hose 10 or an inactive position in which strip securing portion 542 is swung out of the plane of rotary motion of rotary carriage 510 and the elements supported thereon. In FIG. 23A, strip securing portion 542 is shown in the active position, i.e. in a position in which it secures an end of material 40 against the outer circumference of hose 10. A (major) surface of material 40 frictionally contacts an outer circumference of the roller of tensioning mechanism 530 as material 40 is fed and guided from supply roll 520 onto an outer circumference of hose 10. This frictional contact between material 40 and tensioning mechanism 530 effects a tensioning of the segment of material 40 between tensioning mechanism 530 and the portion of material 40 affixed (e.g. by adhesion or by strip securing portion 542) to hose 10. In FIG. 23A, pinch roller 553 is swung into an inactive position to avoid interfering with strip securing portion 542. In FIG. 23B, rotary carriage 510 has been rotated (as indicated by the arrow) vis-à-vis the position of rotary carriage 510 in FIG. 23A, thus wrapping material 40 onto the outer circumference of hose 10. In FIG. 23B, strip securing portion 542 has been swung into an inactive position (not shown) and pinch roller 553 is swung into an active position in which it rolls along and pinches material 40 against the outer circumference of hose 10. Wrapping device 500 may secure material 40 against the outer circumference of hose 10 using strip securing portion 542 during an initial portion of the wrapping operation, e.g. as material 40 is first wrapped around 90°-270° of the outer circumference of hose 10. Wrapping device 500 may move pinch roller 553 into an active position once rotary carriage 510 has rotated far enough since onset of the wrapping operation that pinch roller 553 may be brought into the active position without interfering with strip securing portion 542, e.g. once material 40 has been wrapped around 90°-180° of the outer circumference of hose 10. Once pinch roller 553 has been brought into the active position, wrapping device 500 may move strip securing portion 542 to an inactive position to prevent strip securing portion 542 from interfering with pinch roller 553 during the remainder of the wrapping operation. Pinch roller 553 may induce a radial force that deforms the (braided/wound) tube encasement, thus tensioning material 40 as material 40 is wrapped onto the outer circumference of hose 10. Alternatively, pinch roller 553 may exert essentially no or only a slight radial force and simply serve to ensure that material 40 comes into contact with the outer circumference of hose 10 or underlying layers of material 40 already wrapped onto hose 10, e.g. once material 40 has been cut to its desired length and is no longer pulled by rotary carriage 510.

FIGS. 24A through 24I schematically depict an embodiment of operation of wrapping device 500 depicted in FIGS. 23A and 23B. For the sake of better illustration, only a portion of wrapping device 500 proximate to hose 10 is shown in the Figures.

Figure 24A:
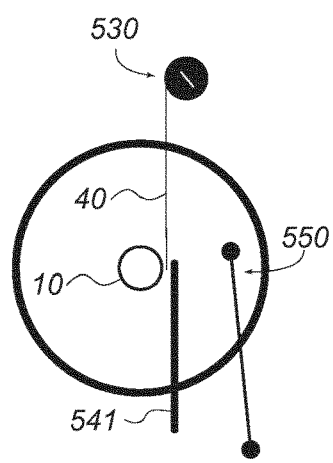
FIGS. 24A through 24I a schematic depiction of an embodiment of operation of wrapping device 500 depicted in FIGS. 23A and 23B.

In FIG. 24A, the wrapping operation has not yet begun; strip securing portion 542 is in an inactive position. Roller mechanism 550 is likewise in an inactive position. Rotary carriage 510 has been rotated to a position where a loose end of material 40 dangles substantially vertically from a roller of tensioning mechanism 530 to a location that allows the loose end to be captured between strip securing portion 542 and an outer circumference of hose 10 when strip securing portion 542 is moved from the inactive position to an active position.

Figure 24B:
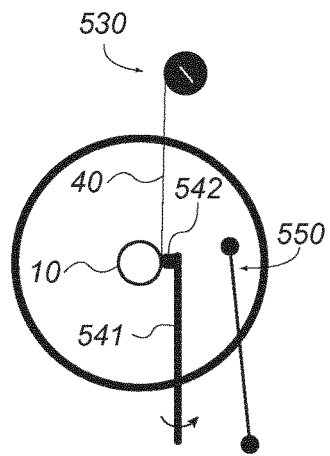

In FIG. 24B, actuation mechanism 541 has been actuated (e.g. rotated as indicated by the arrow) to move strip securing portion 542 from the inactive position to the active position, thus capturing the loose end of material 40 between strip securing portion 542 and an outer circumference of hose 10.

Figure 24C:
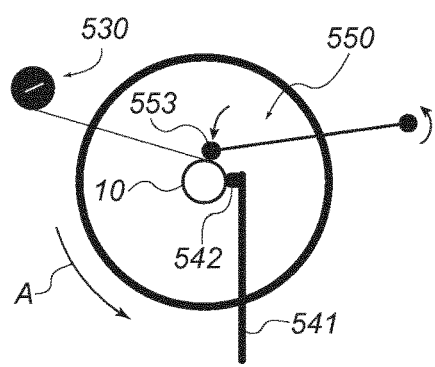

In FIG. 24C, rotary carriage 510 has been rotated vis-à-vis the position shown in FIG. 24B by roughly 90° in a counterclockwise direction as indicated by arrow A. Roller mechanism 550 has been actuated (e.g. rotated around pivot 551 as indicated by the arrows) to move pinch roller 553 from the inactive position to an active position, thus forcing material 40 into contact with the outer circumference of hose 10 (or underlying layers of material 40 already wrapped onto hose 10). The rotation of rotary carriage 510 also transports tensioning mechanism 530 and roller mechanism 550 in a circumferential direction around hose 10.

Figure 24D:
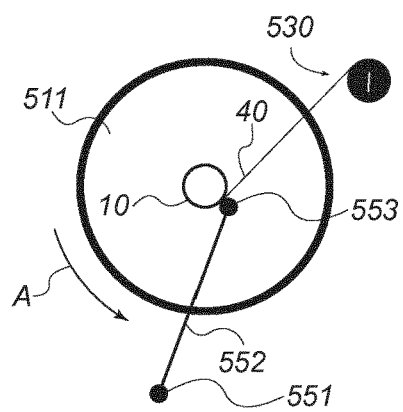

In FIG. 24D, rotary carriage 510 has been rotated vis-à-vis the position shown in FIG. 24C roughly by an additional 90° in a counterclockwise direction as indicated by arrow A. Actuation mechanism 541 has been actuated to move strip securing portion 542 from the active position to the inactive position (not shown), thus moving strip securing portion 542 out of the plane of rotary motion of rotary carriage 510 and the elements such as roller mechanism 550 supported thereon.

Figure 24E:
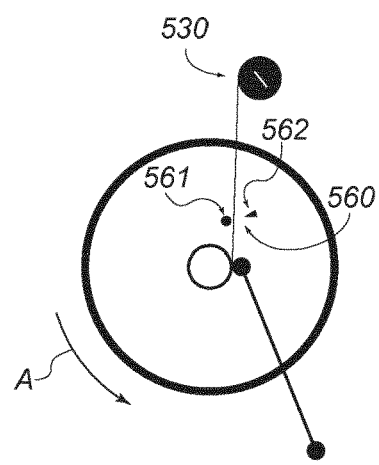

In FIG. 24E, rotary carriage 510 has been rotated vis-à-vis the position shown in FIG. 24D roughly by an additional 45°

(or 405°) in a counterclockwise direction as indicated by arrow A. A cutting device 560 comprising a roller 561 and a knife portion 562 has been moved into the plane of rotary motion of material 40 such that roller 561 and knife portion 562 on opposite sides of material 40.

Figure 24F:
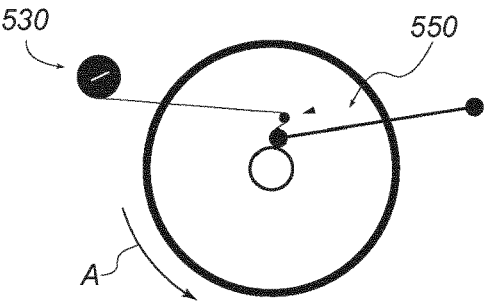

In FIG. 24F, rotary carriage 510 has been rotated vis-à-vis the position shown in FIG. 24E roughly by an additional 90° in a counterclockwise direction as indicated by arrow A. As a result of this rotary motion, material 40 has been partially wrapped around roller 561 and around pinch roller 553, thus drawing out a length of material 40 between tensioning mechanism 530 and cutting device 560 sufficient to reach from tensioning mechanism 530 to an outer circumference of tube 10.

Figure 24G:
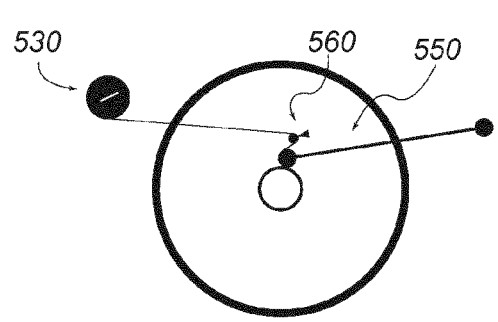

In FIG. 24G, knife portion 562 has been moved against roller 561, thus sectioning material 40.

Figure 24H:
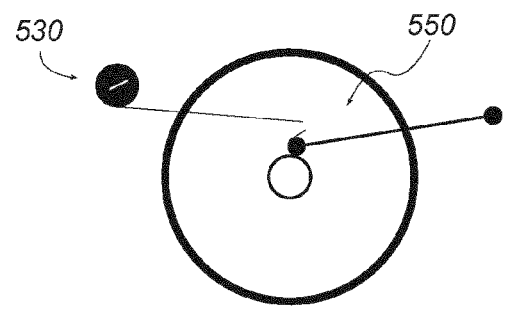

In FIG. 24H, cutting device 560 has been retracted from the plane of rotary motion of rotary carriage 510 and the elements supported thereon.

Figure 24I:
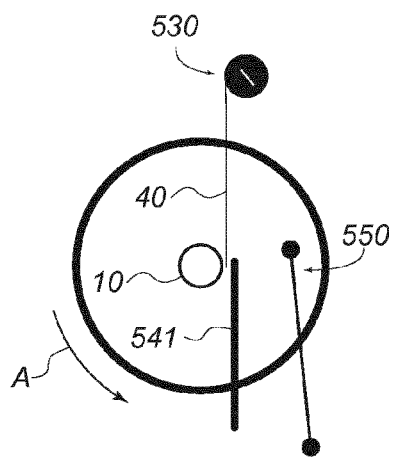

In FIG. 24I, rotary carriage 510 has been rotated vis-à-vis the position shown in FIG. 24H roughly by an additional 270° in a counterclockwise direction as indicated by arrow A to the position shown in FIG. 24A. As a result of this rotary motion, material 40 has been brought into (self-adhesive) contact with the layer of material 40 already applied to the outer circumference of hose 10 by pinch roller 553. Roller mechanism 550 was then actuated (e.g. rotated around pivot 551) to move pinch roller 553 from the active position to the inactive position. The loose (cut) end of material 40 is dangling in the position depicted in FIG. 24A and the next wrapping operation may commence once the tube has been transported in a longitudinal direction by the desired distance between adjacent rings of tensioned material.

Figure 25:
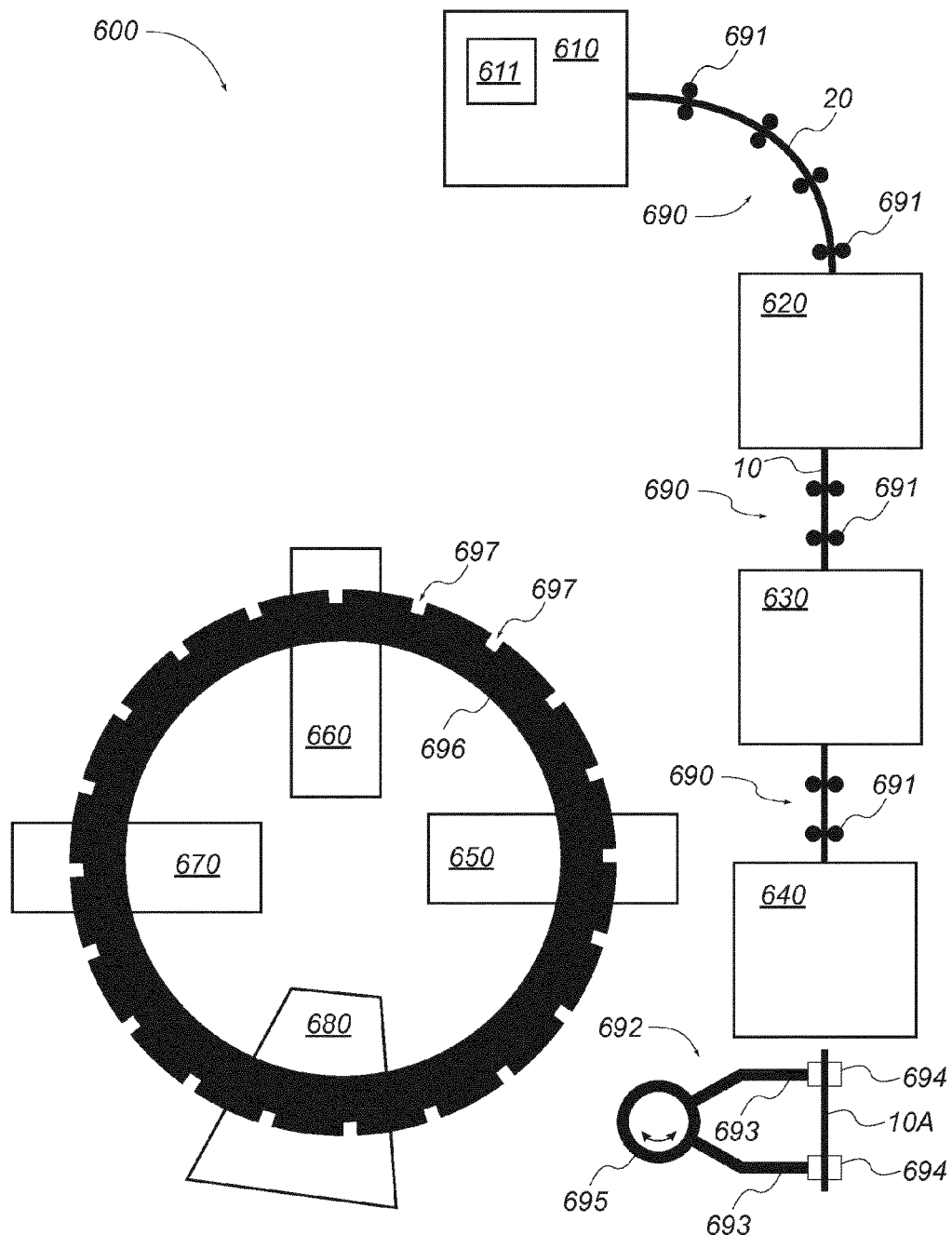
FIG. 25 a schematic depiction of an embodiment of a system in accordance with the present disclosure.

FIG. 25 schematically depicts an embodiment of a system 600 in accordance with the present disclosure, e.g. as described above. In the illustrated embodiment, comprises a tube fabricating device 610, a tube encasement fabricating device 620, a device 630 that forms a displacement inhibiting device/region, a cutting machine 640, an end piece assembly device 650, a connector assembly device 660, an end piece processing device 670, an unload station 680 as well as a transport mechanism 690.

In the illustrated embodiment, tube fabricating device 610 comprises a reservoir 611 for storing plastic pellets from which a tube 20 of a hose 10 is fabricated by tube fabricating device 610. Tube 20 is transported by a plurality of guiding/transport devices 691 of transport mechanism 690 from tube fabricating device 610 to tube encasement fabricating device 620. (For the sake of clearer illustration, not all guiding/transport devices of transport mechanism 690 feature reference signs.) Tube encasement fabricating device 620 forms a tube encasement on an outer circumference of tube 20. Together, the tube encasement and tube 20 form a hose 10 that is transported by transport mechanism 690 from tube encasement fabricating device 620 to device 630 that forms a displacement inhibiting device/region on an outer circumference of hose 10. Device 630 may comprise at least one of a wrapping device, a shrink-processing device and a bond-forming device as described above. Transport mechanism 690 transports hose 10 having a displacement inhibiting device/region formed thereon to cutting machine 640. Cutting machine 640 sections hose 10 through the displacement inhibiting device/region as described above. Cutting machine 640 and/or transport mechanism 690 may individually and/or cooperatively take measures to ensure that hose 10 is sectioned at the desired location. For example, transport mechanism 690 may transport hose 10 by a longitudinal distance as specified by a stored value. Subsequently, one or more sensors provided in cutting machine 640 may provide feedback to transport mechanism 690 indicating whether the displacement inhibiting device/region is located at a necessary location for proper cutting, and transport mechanism 690 may transport hose 10 by slight amounts, accordingly. In the illustrated embodiment, transport mechanism 690 comprises a robotic gripping device 692 having two robotic arms 693 mounted on a main body 695 capable of rotary motion as indicated by the arrow. Each robotic arm 693 comprises a gripping mechanism 694 that grips an outer circumference of hose 10. Cutting machine 640 and robotic gripping device 692 may operate cooperatively such that gripping mechanisms 694 grip hose 10 proximate to each respective cut end of hose 10 as a section of hose 10 is cut from the length of hose 10 fed to cutting machine 640. In the illustrated embodiment, transport mechanism 690 furthermore comprises a carousel 696 having a plurality of gripping mechanisms 697 arranged at (regular) intervals thereon. Robotic gripping device 692 and carousel 696 may operate cooperatively to transport respective sections of hose 10 to end piece assembly device 650, connector assembly device 660, end piece processing device 670, and unload station 680. For example, after receiving a section of hose 10 from cutting machine 640, robotic gripping device 692 may actuate robotic arms 693 to bend the section of hose 10 into the shape of a U. Robotic gripping device 692 may then rotate to a position where the respective ends of the section of hose 10 are received and gripped by respective gripping mechanisms 697 of carousel 696. Carousel 696 then rotates, e.g. in stepped motion, to transport the section of hose 10 to end piece assembly device 650, connector assembly device 660, end piece processing device 670, and unload station 680. As described above, end piece assembly device 650 assembles an end piece onto each respective end of the section of hose 10. Connector assembly device 660 assembles a connector onto each respective end of the section of hose 10 as described above. End piece processing device 670 processes the respective end pieces as described above. For example, end piece processing device 670 may crimp a portion of the respective end piece to induce a radial force onto a circumference of the section of hose 10, which radial force acts to secure the respective connector to the section of hose 10. At unload station 680, gripping mechanisms 697 may release the respective section of hose 10 that then drops into a basket of finished hose products. Unload station 680 may comprise one or more sensors for inspecting the finished hose products. Unload station 680 may control gripping mechanisms 697 as a function of signals received from the sensors. For example, gripping mechanisms 697 may be controlled so as to drop a section of hose 10 into a "defect" basket if the signals received from the sensors indicate that assembly/processing of the hose, end piece and/or connector does not fulfill specified standards.

In the present disclosure, the verb "may" is used to designate optionally/noncompulsoriness. In other words, something that "may" can, but need not. In the present disclosure, the verb "comprise" may be understood in the sense of including. Accordingly, the verb "comprise" does not exclude the presence of other elements/actions. In the present disclosure, relational terms such as "first," "second," "top," "bottom" and the like may be used solely to distinguish one entity or action from another entity or action without necessarily requiring or implying any actual such relationship or order between such entities or actions.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

In the present disclosure, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of the invention, even those disclosed solely in combination with other features of the invention, may be combined in any configuration excepting those readily apparent to the person skilled in the art as nonsensical. Likewise, use of the singular and plural is solely for the sake of illustration and is not to be interpreted as limiting.

The embodiments disclosed hereinabove may be summarized as follows.

Embodiment 1

A hose (1) comprising:
a tube (2);
a tube encasement (3) encasing an outer circumference of said tube; and
a ring of tensioned material (4) around an outer circumference of said tube encasement, wherein
said ring of tensioned material applies a first radial force onto said tube encasement and induces a second radial force from said tube encasement onto said tube, and
said hose comprises a cut surface that extends through an entire cross-section of said tube, said tube encasement and said ring of tensioned material.

Embodiment 2

The tube section of Embodiment 1, wherein said tensioned material is a shrinkable material.

Embodiment 3

The hose of Embodiment 1 or 2, wherein:
a product of said second radial force and a coefficient of friction between an inner circumference of said tube encasement and an outer circumference of said tube at a location of said second radial force is greater than at least one of 5 newton, 10 newton and 50 newton.

Embodiment 4

A hose (1) comprising:
a tube (2);
a tube encasement (3) encasing an outer circumference of said tube; and
a ring of bonded material (4) at an outer circumference of said tube encasement, wherein
said ring of bonded material forms a bond between said tube encasement and a tube encased by said tube encasement, and
said hose comprises a cut surface that extends through an entire cross-section of said tube, said tube encasement and said ring of bonded material.

Embodiment 5

The hose of Embodiment 4, wherein:
said ring of bonded material comprises a portion of said tube encasement that has been melted.

Embodiment 6

The hose of Embodiment 4, wherein:
said ring of bonded material comprises a bonding material that differs from and bonds a material of said tube encasement.

Embodiment 7

The hose of any one of Embodiments 1 to 6, comprising:
a connector having an insert portion positioned in a lumen of said tube; and
an end piece (5) that forms a bond between said end piece, said tube encasement, said tube and said insert portion.

Embodiment 8

The hose of any one of Embodiments 1 to 7, wherein:
said tube has a tube wall selected from the group consisting of a corrugated tube wall, a tube wall having a spiral groove, and a smooth tube wall.

Embodiment 9

The hose of any one of Embodiments 1 to 8, wherein:
said tube encasement comprises at least one of a braid of polyamide material and a braid of metal material.

Embodiment 10

The hose of any one of Embodiments 1 to 9, wherein:
said tube is displaceable relative to said tube encasement over at least 80% of a length from a first end of said tube to a end of said tube.

Embodiment 11

The hose of any one of Embodiments 1 to 10, wherein:
said outer circumference of said tube encasement has a diameter of less than 15 mm.

Embodiment 12

A system, comprising:
a wrapping device that forms a ring of tensioned material (4) by wrapping a material around an outer circumference of a tube encasement (3); and
a cutting device that cuts through an entire cross-section of said ring of tensioned material, said tube encasement and a tube (2) encased by said tube encasement, wherein said ring of tensioned material applies a first radial force onto said tube encasement and induces a second radial force from said tube encasement onto said tube.

Embodiment 13

The system of Embodiment 12, wherein:
said wrapping device comprises a braking device that brakes a feed of said material to tension said material during said wrapping.

Embodiment 14

The system of Embodiment 12 or 13, wherein:
said wrapping device comprises a pressure surface that applies pressure to said material in a direction of said tube encasement at an area of first contact between said tube encasement and said material as said area of first contact moves circumferentially around at least half a circumference of said tube encasement.

Embodiment 15

A system, comprising:
a wrapping device that wraps a strip of material around an outer circumference of a tube encasement (3);
a shrink-processing device that shrink processes said wrapped strip of material into a ring of tensioned material (4); and
a cutting device that cuts through an entire cross-section of said ring of tensioned material, said tube encasement and a tube (2) encased by said tube encasement, wherein
said ring of tensioned material applies a first radial force onto said tube encasement and induces a second radial force from said tube encasement onto said tube.

Embodiment 16

A system, comprising:
a bond-forming device that forms a ring of bonded material (4) at an outer circumference of a tube encasement (3); and
a cutting device that cuts through an entire cross-section of said ring of bonded material, said tube encasement and a tube (2) encased by said tube encasement, wherein
said forming of said ring of bonded material forms a bond between said tube encasement and a tube encased by said tube encasement.

Embodiment 17

The system of Embodiment 16, wherein:
said bond-forming device forms said ring of bonded material and said bond by melting a portion of said tube encasement.

Embodiment 18

The system of Embodiment 16, wherein:
said bond-forming device forms said ring of bonded material and said bond by injecting a bonding material into said tube encasement.

Embodiment 19

The system of any one of Embodiments 12 to 18, comprising:

a connector insertion device that inserts an insert portion of a connector into a lumen of said tube; and
an end piece processing device that processes an end piece (5) to form a bond between the end piece, said tube encasement, said tube and said insert portion.

Embodiment 20

A system, comprising:
a bond-forming device that forms a ring of bonded material (4) at an outer circumference of a tube encasement (3);
a cutting device that cuts through an entire cross-section of said ring of bonded material, said tube encasement and a tube (2) encased by said tube encasement;
an end piece processing device that processes an end piece (5) to form a bond between the end piece, said tube encasement, said tube and an insert portion of a connector positioned in a lumen of said tube; and
a gripping device, wherein
said gripping device grips said tube encasement from said cutting to said forming of a bond, said gripping preventing displacement of said tube encasement relative to said tube.

Embodiment 21

The system of Embodiment 20, comprising:
a connector insertion device that inserts said insert portion into said lumen.

Embodiment 22

The system of any one of Embodiments 12 to 21, comprising:
an assembly device that assembles an end piece (5) onto a cut end of said tube and said tube encasement, said cut end being received by an orifice of said end piece.

Embodiment 23

A method, comprising:
forming a ring of tensioned material (4) around an outer circumference of a tube encasement (3); and
cutting through an entire cross-section of said ring of tensioned material, said tube encasement and a tube (2) encased by said tube encasement, wherein
said ring of tensioned material applies a first radial force onto said tube encasement and induces a second radial force from said tube encasement onto said tube.

Embodiment 24

The method of Embodiment 23, wherein said forming comprises:
wrapping a material around said outer circumference; and
braking a feed of said material to tension said material during said wrapping.

Embodiment 25

The method of Embodiment 23, wherein said forming comprises:
wrapping a material around said outer circumference; and
applying pressure to said material in a direction of said tube encasement at an area of first contact between said tube encasement and said material as said area of first contact moves circumferentially around at least half a circumference of said tube encasement during said wrapping.

Embodiment 26

The method of Embodiment 23, wherein said forming comprises:
wrapping a strip of material around said outer circumference; and
shrinking said wrapped strip of material into said ring of tensioned material.

Embodiment 27

A method, comprising:
forming a ring of bonded material (4) at an outer circumference of a tube encasement (3); and
cutting through an entire cross-section of said ring of bonded material, said tube encasement and a tube (2) encased by said tube encasement, wherein
said forming of a ring of bonded material forms a bond between said tube encasement and a tube encased by said tube encasement.

Embodiment 28

The method of Embodiment 27, wherein:
said forming of a ring of bonded material comprises melting a portion of said tube encasement.

Embodiment 29

The method of Embodiment 27, wherein:
said forming of a ring of bonded material comprises injecting a bonding material into said tube encasement.

Embodiment 30

The method of any one of Embodiments 23 to 29, comprising:
inserting an insert portion of a connector into a lumen of said tube; and forming a bond between an end piece (5), said tube encasement, said tube and said insert portion.

Embodiment 31

A method, comprising:
forming a ring of bonded material (4) at an outer circumference of a tube encasement (3);
cutting through an entire cross-section of said ring of bonded material, said tube encasement and a tube (2) encased by said tube encasement;
forming a bond between an end piece (5), said tube encasement, said tube and an insert portion of a connector positioned in a lumen of said tube; and
gripping said tube encasement from a point in time prior to said cutting to a point in time subsequent to said forming of a bond, said gripping preventing displacement of said tube encasement relative to said tube.

Embodiment 32

The method of Embodiment 31, comprising:
inserting said insert portion into said lumen.

Embodiment 33

The method of any one of Embodiments 23 to 32, comprising:
assembling an end piece (5) onto a cut end of said tube and said tube encasement, said cut end being received by an orifice of said end piece.

Embodiment 34

A hose (1) obtained by a process of:
forming a ring of tensioned material (4) around an outer circumference of a tube encasement (3); and
cutting through an entire cross-section of said ring of tensioned material, said tube encasement and a tube (2) encased by said tube encasement, wherein
said ring of tensioned material applies a first radial force onto said tube encasement and induces a second radial force from said tube encasement onto said tube.

Embodiment 35

The hose of Embodiment 34, wherein said forming comprises:
wrapping a material around said outer circumference; and
braking a feed of said material to tension said material during said wrapping.

Embodiment 36

The hose of Embodiment 34, wherein said forming comprises:
wrapping a material around said outer circumference; and
applying pressure to said material in a direction of said tube encasement at an area of first contact between said tube encasement and said material as said area of first contact moves circumferentially around at least half a circumference of said tube encasement during said wrapping.

Embodiment 37

The hose of Embodiment 34, wherein said forming comprises:
wrapping a strip of material around said outer circumference; and
shrinking said wrapped strip of material into said ring of tensioned material.

Embodiment 38

A hose (1) obtained by a process of:
forming a ring of bonded material (4) at an outer circumference of a tube encasement (3); and
cutting through an entire cross-section of said ring of bonded material, said tube encasement and a tube (2) encased by said tube encasement, wherein
said forming of a ring of bonded material forms a bond between said tube encasement and a tube encased by said tube encasement.

Embodiment 39

The hose of Embodiment 38, wherein:
said forming of a ring of bonded material comprises melting a portion of said tube encasement.

Embodiment 40

The hose of Embodiment 38, wherein:
said forming of a ring of bonded material comprises injecting a bonding material into said tube encasement.

Embodiment 41

The hose of any one of Embodiments 34 to 40, wherein said process comprises:
inserting an insert portion of a connector into a lumen of said tube; and forming a bond between an end piece (5), said tube encasement, said tube and said insert portion.

Embodiment 42

A hose (1) obtained by a process of:
forming a ring of bonded material (4) at an outer circumference of a tube encasement (3);
cutting through an entire cross-section of said ring of bonded material, said tube encasement and a tube (2) encased by said tube encasement;
forming a bond between an end piece (5), said tube encasement, said tube and an insert portion of a connector positioned in a lumen of said tube; and
gripping said tube encasement from a point in time prior to said cutting to a point in time subsequent to said forming of a bond, said gripping preventing displacement of said tube encasement relative to said tube.

Embodiment 43

The hose of Embodiment 42, wherein said process comprises:
inserting said insert portion into said lumen.

Embodiment 44

The hose of any one of Embodiments 34 to 43, wherein said process comprises:
assembling an end piece (5) onto a cut end of said tube and said tube encasement, said cut end being received by an orifice of said end piece.

Embodiment 45

A method of sectioning a tube and a tube encasement, said method comprising:
positioning an annular tensioning device on an outer circumference of said tube encasement;
altering a diameter of said annular tensioning device to apply a first radial force from said annular tensioning device onto said tube encasement and to induce a second radial force from said tube encasement onto said tube; and
cutting through an entire cross-section of said annular tensioning device, said tube encasement and said tube.

Embodiment 46

The method of Embodiment 45, wherein:
said cutting sections said tube into a first tube section and a second tube section, sections said tube encasement into a first tube encasement section and a second tube encasement section and sections said annular tensioning device into a first annular tensioning device section and a second annular tensioning device section.

Embodiment 47

The method of Embodiment 46, wherein:
said first annular tensioning device section applies a third radial force onto said first tube encasement section and induces a fourth radial force from said first tube encasement section onto said first tube section, and
said fourth radial force prevents displacement of said first tube section relative to said first tube encasement section in a longitudinal direction of said first tube encasement section at said cut cross-section when said first tube section and said first tube encasement section are bent to a radius of curvature of 50 mm.

Embodiment 48

The method of Embodiment 46, wherein:
said first tube section is displaceable relative to said first tube encasement section over at least 80% of a length from a first end of said first tube section to a second end of said first tube section.

Embodiment 49

The method of Embodiment 46, comprising:
inserting a cut end of said first tube section, said first tube encasement section and said first annular tensioning device section into an orifice of an end piece, a depth of said orifice being less than a width of said first annular tensioning device section in a longitudinal direction of said first tube section.

Embodiment 50

The method of Embodiment 45, wherein:
said cutting comprises melting a portion of at least one of said tube encasement and said annular tensioning device, and
said melted portion bonds at least one of said tube and said annular tensioning device to said tube encasement when cooled to 80° C.

Embodiment 51

A method of sectioning a tube and a tube encasement, said method comprising:
forming a ring of tensioned material around an outer circumference of said tube encasement; and
cutting through an entire cross-section of said ring of tensioned material, said tube encasement and said tube, wherein
said ring of tensioned material applies a first radial force onto said tube encasement and induces a second radial force from said tube encasement onto said tube.

Embodiment 52

The method of Embodiment 51, wherein said forming a ring of tensioned material comprises:
forming a ring of material around said outer circumference; and
tensioning said ring of material.

Embodiment 53

The method of Embodiment 52, wherein:
said tensioning comprises at least one of curing said material, heat shrinking said material, cinching up said material.

Embodiment 54

The method of Embodiment 51, wherein said forming a ring of tensioned material comprises:
securing a first end of a material to said outer circumference;
tensioning said material; and
wrapping said tensioned material around said outer circumference; and wherein said forming a ring of tensioned material optionally comprises:
securing a second end of said tensioned material to an outer circumference of said wrapped material.

Embodiment 55

The method of Embodiment 51, wherein:
said cutting sections said tube into a first tube section and a second tube section, sections said tube encasement into a first tube encasement section and a second tube encasement section and sections said ring of tensioned material into a first annular section of tensioned material and a second annular section of tensioned material.

Embodiment 56

The method of Embodiment 55, wherein:
said first annular tensioning device section applies a third radial force onto said first tube encasement section and induces a fourth radial force from said first tube encasement section onto said first tube section, and
said fourth radial force prevents displacement of said first tube section relative to said first tube encasement section in a longitudinal direction of said first tube encasement section at said cut cross-section when said first tube section and said first tube encasement section are bent to a radius of curvature of 50 mm.

Embodiment 57

The method of Embodiment 55, wherein:
said first tube section is displaceable relative to said first tube encasement section over at least 80% of a length from a first end of said first tube section to a second end of said first tube section.

Embodiment 58

The method of Embodiment 55, comprising:
inserting a cut end of said first tube section, said first tube encasement section and said first annular section of tensioned material into an orifice of an end piece, a depth of said orifice being less than a width of said first annular section of tensioned material in a longitudinal direction of said first tube section.

Embodiment 59

The method of Embodiment 51, wherein:
said cutting comprises melting a portion of at least one of said tube encasement and said ring of tensioned material, and
said melted portion bonds at least one of said tube and said ring of tensioned material to said tube encasement when cooled to 80° C.

The invention claimed is:

1. A hose comprising:
a tube;
a tube encasement encasing an outer circumference of said tube; and
a ring of tensioned material around an outer circumference of said tube encasement, wherein
said ring of tensioned material applies a first radial force onto said tube encasement and induces a second radial force from said tube encasement onto said tube, and
said hose comprises a cut surface that extends through an entire cross-section of said tube, said tube encasement and said ring of tensioned material.

2. The tube section of claim 1, wherein said tensioned material is a shrinkable material.

3. The hose of claim 1, wherein:
a product of said second radial force and a coefficient of friction between an inner circumference of said tube encasement and an outer circumference of said tube at a location of said second radial force is greater than 5 newton.

4. A hose comprising:
a tube;
a tube encasement encasing an outer circumference of said tube; and
a ring of bonded material at an outer circumference of said tube encasement,
wherein
said ring of bonded material forms a bond between said tube encasement and a tube encased by said tube encasement, and
said hose comprises a cut surface that extends through an entire cross-section of said tube, said tube encasement and said ring of bonded material.

5. The hose of claim 4, wherein:
said ring of bonded material comprises a portion of said tube encasement that has been melted.

6. The hose of claim 4, wherein:
said of bonded material comprises a bonding material that differs from and bonds a material of said tube encasement.

7. The hose of claim 1, comprising:
a connector having an insert portion positioned in a lumen of said tube; and
an end piece that forms a bond between said end piece, said tube encasement, said tube and said insert portion.

8. The hose of claim 1, wherein:
said tube has a tube wall selected from the group consisting of a corrugated tube wall, a tube wall having a spiral groove, and a smooth tube wall.

9. The hose of claim 1, wherein:
said tube encasement comprises at least one of a braid of polyamide material and a braid of metal material.

10. The hose of claim 1, wherein:
said tube is displaceable relative to said tube encasement over at least 80% of a length from a first end of said tube to a second end of said tube.

11. The hose of claim 1, wherein:
said outer circumference of said tube encasement has a diameter of less than 15 mm.

12. A hose comprising:
a tube;
a tube encasement encasing an outer circumference of said tube; and
a ring of tensioned around an outer circumference of said tube encasement, wherein
said ring of tensioned material applies a first radial force onto said tube encasement and induces a second radial force from said tube encasement onto said tube,
said hose comprises a cut surface that extends through an entire cross-section of said tube, said tube encasement and said ring of tensioned material, and
said second radial force prevents longitudinal displacement of said tube encasement relative to said tube in a region of said ring of tensioned material.

13. The hose of claim 12, wherein:
said tube is displaceable relative to said tube encasement over at least 80% of a length from a first end of said tube to a second end of said tube.

14. A hose comprising:
a tube;
a tube encasement encasing an outer circumference of said tube; and
a ring of bonded material at an outer circumference of said tube encasement, wherein
said ring of bonded material forms a bond between said tube encasement and a tube encased by said tube encasement, and
said hose comprises a cut surface that extends through an entire cross-section of said tube, said tube encasement and said ring of bonded material, and
said ring of bonded material prevents longitudinal displacement of said tube encasement relative to said tube in a region of said ring of bonded material.

15. The hose of claim 14, wherein:
said tube is displaceable relative to said tube encasement over at least 80% of a length from a first end of said tube to a second end of said tube.

16. A hose comprising:
a tube;
a tube encasement encasing an outer circumference of said tube; and
a ring of bonded material at an outer circumference of said tube encasement, wherein
said ring of bonded material forms a bond between said tube encasement and a tube encased by said tube encasement,
said hose comprises a cut surface that extends through an entire cross-section of said tube, said tube encasement and said ring of bonded material, and
said ring of bonded material comprises a portion of said tube encasement that has been incited.

* * * * *